(12) United States Patent
Wittenbreder

(10) Patent No.: US 6,252,383 B1
(45) Date of Patent: Jun. 26, 2001

(54) BUCK AND BOOST POWER CONVERTERS WITH NON-PULSATING INPUT AND OUTPUT TERMINAL CURRENTS

(75) Inventor: Ernest H. Wittenbreder, Flagstaff, AZ (US)

(73) Assignee: Technical Witts, Inc., Flagstaff, AR (US)

( * ) Notice: Subject to any disclaimer, the term of this patent is extended or adjusted under 35 U.S.C. 154(b) by 24 days.

(21) Appl. No.: 09/614,538

(22) Filed: Jul. 11, 2000

(51) Int. Cl.$^7$ .................................................. G05F 1/613
(52) U.S. Cl. ........................ 323/222; 323/225; 323/271; 323/282
(58) Field of Search ................................. 323/222, 225, 323/271, 282, 351

(56) References Cited

U.S. PATENT DOCUMENTS

| | | | |
|---|---|---|---|
| 4,184,197 | | 1/1980 | Cuk ............................................ 363/16 |
| 4,857,822 | * | 8/1989 | Tabisz et al. ........................... 323/282 |
| 4,931,716 | * | 6/1990 | Jovanovic et al. ..................... 323/271 |
| 5,066,900 | * | 11/1991 | Bassett ................................... 323/222 |
| 5,287,261 | * | 2/1994 | Ehsani ................................... 323/225 |
| 5,663,635 | * | 9/1997 | Vinciarcelli et al. .................. 323/282 |
| 5,815,386 | * | 9/1998 | Gordon .................................. 323/225 |
| 5,844,790 | * | 12/1998 | Jacobs et al. .......................... 323/222 |
| 5,914,587 | * | 6/1999 | Liu ........................................ 323/225 |
| 5,959,438 | * | 9/1999 | Jovanovic et al. ..................... 323/222 |
| 6,094,038 | * | 7/2000 | Lethellier ............................... 323/271 |

OTHER PUBLICATIONS

Cuk & Middlebrook, "Advances in Switched–Mode Power Conversion, Volumes I and II," Dec. 1983, pp. 318 & 319.

* cited by examiner

Primary Examiner—Jeffrey Sterrett

(57) ABSTRACT

A DC to DC converter circuit which accomplishes both non-pulsating input and output currents using a single simple coupled inductor is revealed. The DC to DC converter accomplishes either buck or boost conversion using a simple circuit requiring only two switches, one of which may be a simple diode rectifier, a capacitor, and two inductors, which may be colocated on a single common magnetic core. These converters are, in some ways, similar to the Cuk converter, but they do not provide inverted outputs. Zero voltage switching versions of these converters are revealed. Also revealed are techniques and methodology for reducing both input and output current ripple to near zero levels. The buck version of the circuit accomplishes DC to DC conversion without inversion and with no right half plane zero in its control to output transfer function. The boost version is also non-inverting.

16 Claims, 26 Drawing Sheets

BUCK AND BOOST POWER CONVERTERS WITH NON-PULSATING INPUT AND OUTPUT TERMINAL CURRENTS

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish power conversion from one DC voltage level to another DC voltage level using an intermediate energy storage mechanism such as a power inductor. Examples of such power conversion circuits include the buck, boost, and buck boost converters which are well known to those skilled in the art of power conversion. These converters are simple, requiring only one large magnetic storage element, the power inductor, and two switches. Typically input and output capacitors are added to the basic circuit. For isolated power conversion an isolation transformer or a coupled inductor is required in addition to or instead of the power inductor. One problem associated with practical non-isolated power conversion circuits that employ the buck, boost, or buck boost converters is that either the input current, the output current, or both the input and output current are pulsating, that is non-continuous. The pulsating currents result in high ripple currents and high ripple voltages by comparison to inputs or outputs in which the input or output current is continuous or non-pulsating. In order to reduce the effects of the pulsating currents an additional filter stage using an additional inductor and capacitor, or LC combination, or the use of a much larger input or output capacitor is required. The consequence of the additional filtering is higher cost and, in the case of the LC filter, higher losses. For example, the buck converter has a pulsating (discontinuous) input current and a non-pulsating (continuous) output current. Power supplies that use buck converters often employ an LC input filter to reduce the ripple resulting from the pulsating input current. One specific example is the Datel dual output BMP models which use a buck post regulator with an LC input filter, which is illustrated in FIG. 1, to generate a second power supply output. The BMP models employ the main output of the power supply as the input to the buck post regulator. If they did not use an input LC filter with the buck post regulator the pulsating input current of the buck post regulator would compromise the ripple performance of the converter's main output. One example of prior art that overcomes the problem is the famous Cuk converter, shown in FIG. 2, which is also referred to by its inventor as the optimal topology converter. The Cuk converter circuit is optimal in the sense that both the input current and output current are non-pulsating. One of the likely reasons that the Cuk converter was not chosen in the Datel design is that the non-isolated Cuk converter has an output voltage that is opposite in sign to its input. Another shortcoming of the Cuk converter is that its control to output transfer function has a right half plane zero which, in practical terms, limits the available bandwidth, which in some cases, especially where fast load current transient response is a requirement, renders the Cuk converter unsuitable. Cuk, in a paper included in his book entitled "Advances in Switched-Mode Power Conversion" on page 319 explains how the re-orientation or rotation of the switching cell in the Cuk converter leads to buck and boost converters with continuous input and output currents. The continuous input and output current buck and boost converters that Cuk describes in his book on page 319 are simply the well known buck converter with an LC input filter, shown in FIG. 1, and the well known boost converter with an LC output filter, respectively. The Datel design is then the buck implementation of the Cuk converter as described by Cuk in his own writings. The same process of generating continuous input and output current buck and boost converters from the Cuk switching cell is also described in a recent book by Robert Erickson entitled "Fundamentals of Power Electronics" on pages 141 and 142. In Erickson's book he describes a process for generating the buck and boost forms of the Cuk converter similar to the process described by Cuk with identical results. There is one important feature of the Cuk converter which is missing in the buck and boost derivations described by Cuk and Erickson. The Cuk described buck and boost derivations both require two separate inductors which cannot be magnetically coupled. This requirement is due to the fact that the AC wave forms of the two inductors are dissimilar, whereas the AC wave forms of the two inductors in the Cuk converter are very similar or identical which enables the combination of the two chokes of the Cuk converter in a single simple magnetically coupled inductor construction. In the non-pulsating buck and boost converters described by Cuk and Erickson one of the chokes has a large AC winding voltage component and the other has a very small AC winding voltage component. In the same book by Cuk on page 337 Cuk describes how his optimal topology converter works when implemented with the two chokes combined in a single simple coupled inductor, as illustrated in FIG. 3. Several patents have been issued on the basic Cuk converter and the coupled inductor versions of the Cuk converter. What is needed are simple optimal topology converters in which the two inductors can be combined into a single simple magnetically coupled inductor and can accomplish step up or step down DC to DC conversion without inversion or isolating transformer. Such an optimal topology converter in the buck form would reduce the size and cost of converters of the Datel BMP type by combining the two inductors into a simple single coupled magnetic circuit element. Such an optimal topology converter in the boost form would satisfy a need for converters similar to the Datel BMP type, but where the main output voltage is lower than the voltage of the second output.

OBJECTS AND ADVANTAGES

One object of the subject invention is to provide simple DC to DC power conversion circuits with both continuous input current and continuous output current using a single simple magnetically coupled inductor.

Another object of the subject invention is to provide a simple non-inverting optimal topology step down DC to DC power conversion circuit without a right half plane zero in the control to output transfer function.

Another object of the subject invention is to provide a simple non-inverting optimal topology step up DC to DC power conversion circuit.

Another object of the subject invention is to provide simple zero voltage switching DC to DC power conversion circuits with both continuous input current and continuous output current using a single simple magnetically coupled inductor and a small inductor to drive the soft switching transitions.

Reference Numerals

| | |
|---|---|
| 100 DC input voltage source | 101 inductor |
| 102 node | 103 node |
| 104 switch | 105 node |
| 106 capacitor | 107 node |
| 108 switch | 109 inductor |
| 110 capacitor | 111 load |
| 200 DC input voltage source | 201 node |
| 202 node | 203 switch |
| 204 node | 205 inductor |
| 206 switch | 207 node |
| 208 capacitor | 209 inductor |
| 210 node | 211 capacitor |
| 212 load | |

SUMMARY

The subject invention uses a pair of inductors arranged so that their AC winding voltages are equal, a pair of switches, and a coupling capacitor to achieve buck and boost converters with non-pulsating input and output currents. The most preferred embodiment couples the two inductors on a common core so that only one large magnetic circuit element is required. Embodiments that provide zero voltage switching and zero ripple currents are also described.

DESCRIPTION OF THE PREFERRED EMBODIMENTS

Buck Derived Topology

Figure 1:
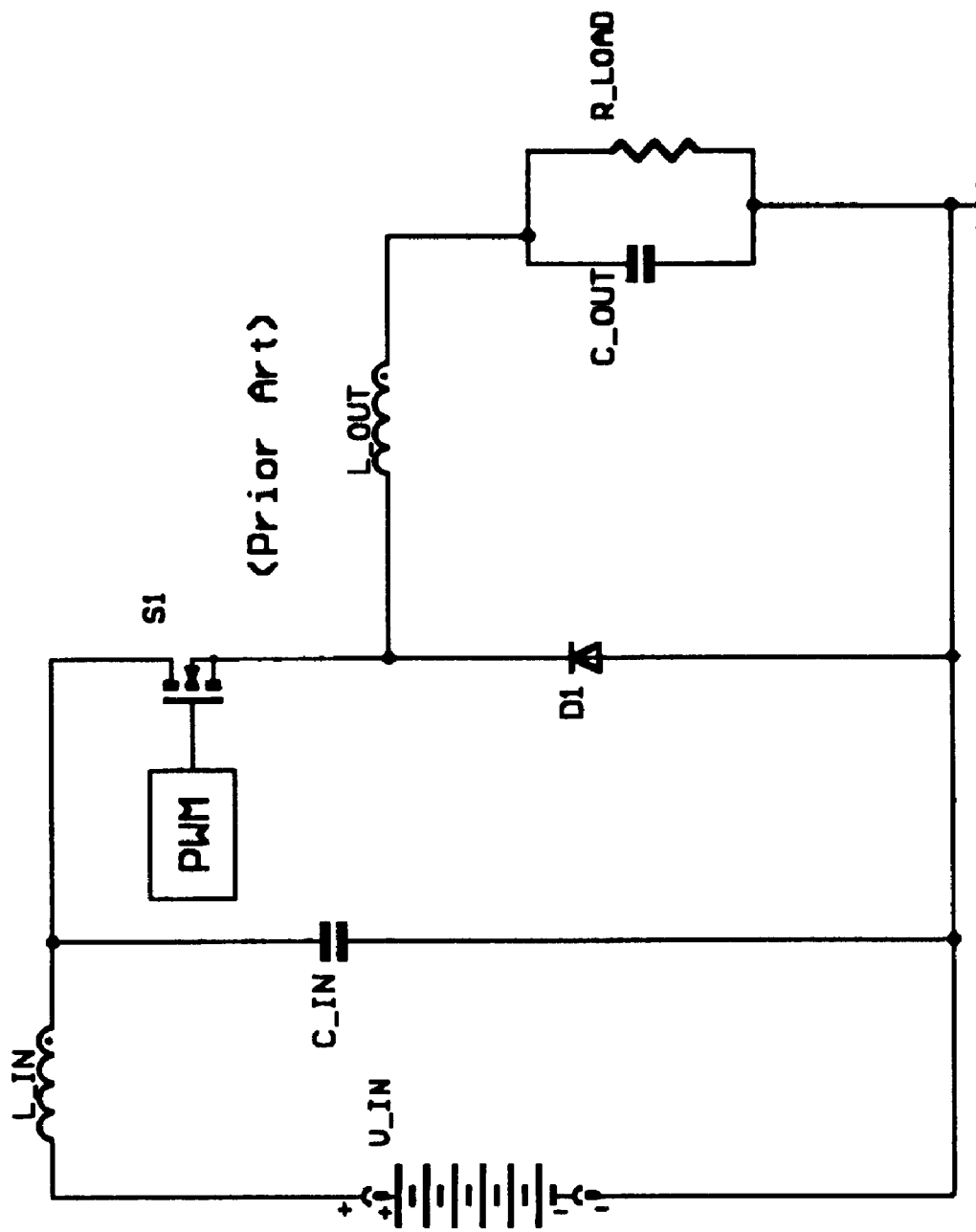
FIG. 1 illustrates a buck regulator with an LC input filter which accomplishes non-pulsating input and output currents.
Figure 2:
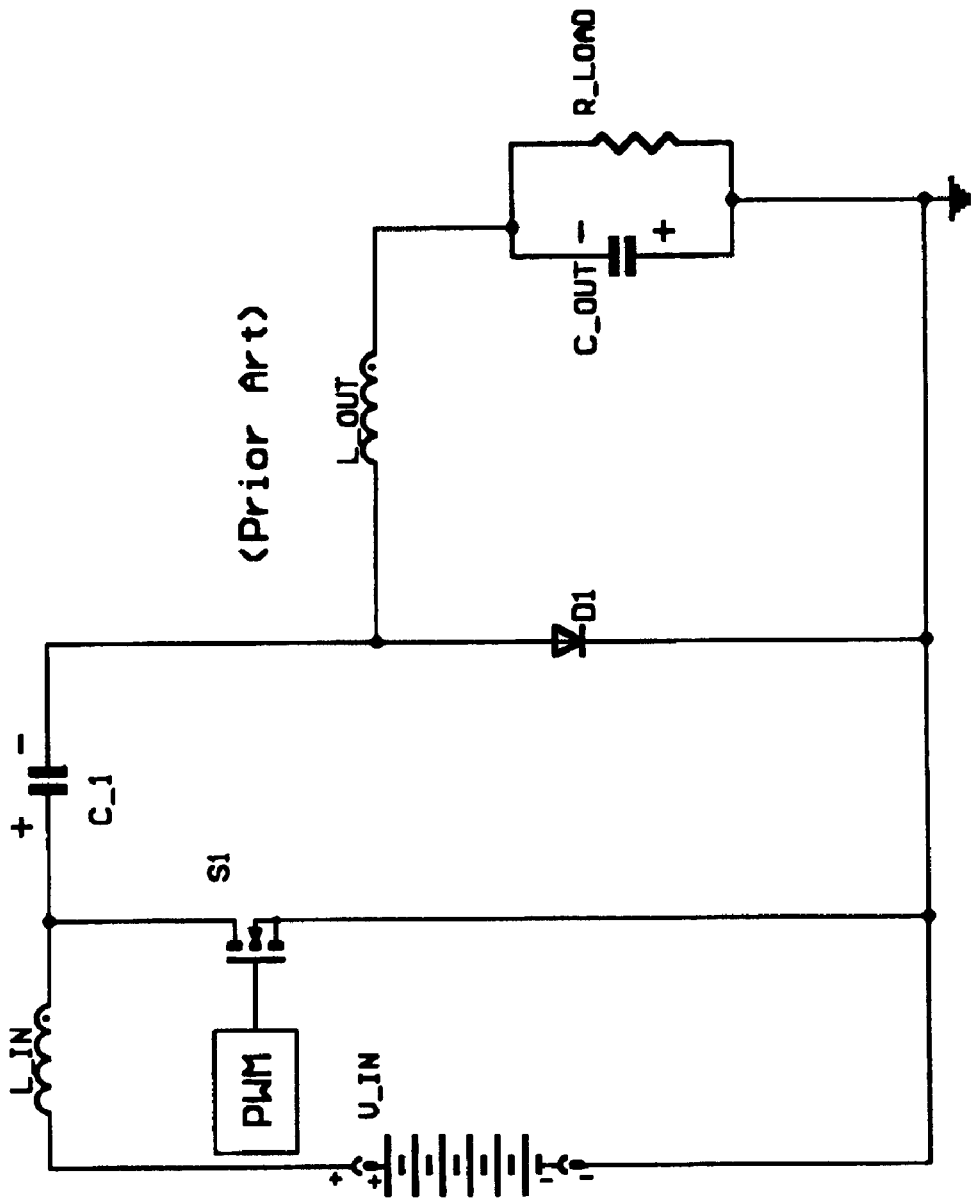
FIG. 2 illustrates a Cuk converter with two separate chokes.
Figure 3:
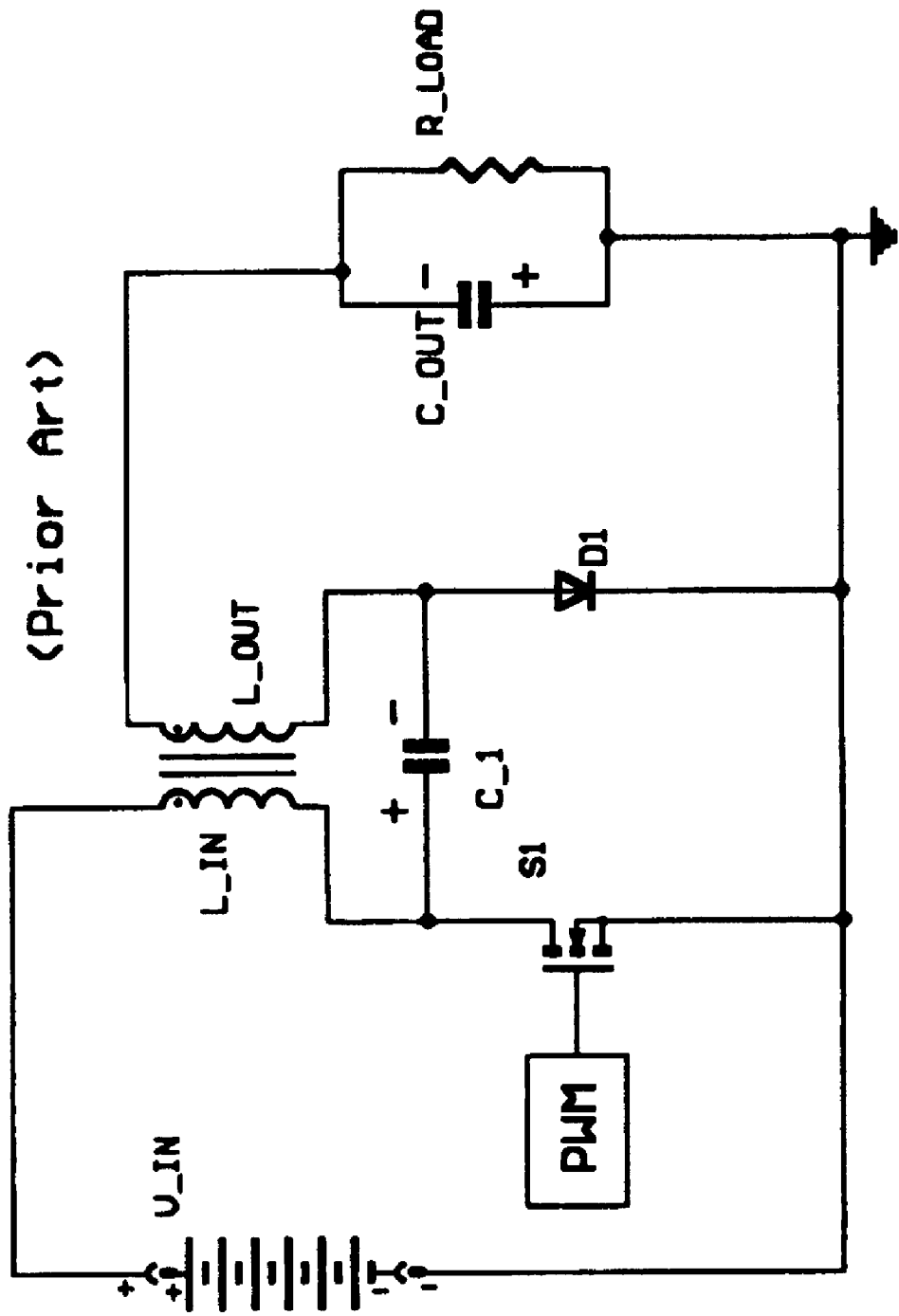
FIG. 3 illustrates a Cuk converter with the two chokes combined into a single simple magnetically coupled inductor.
Figure 4:
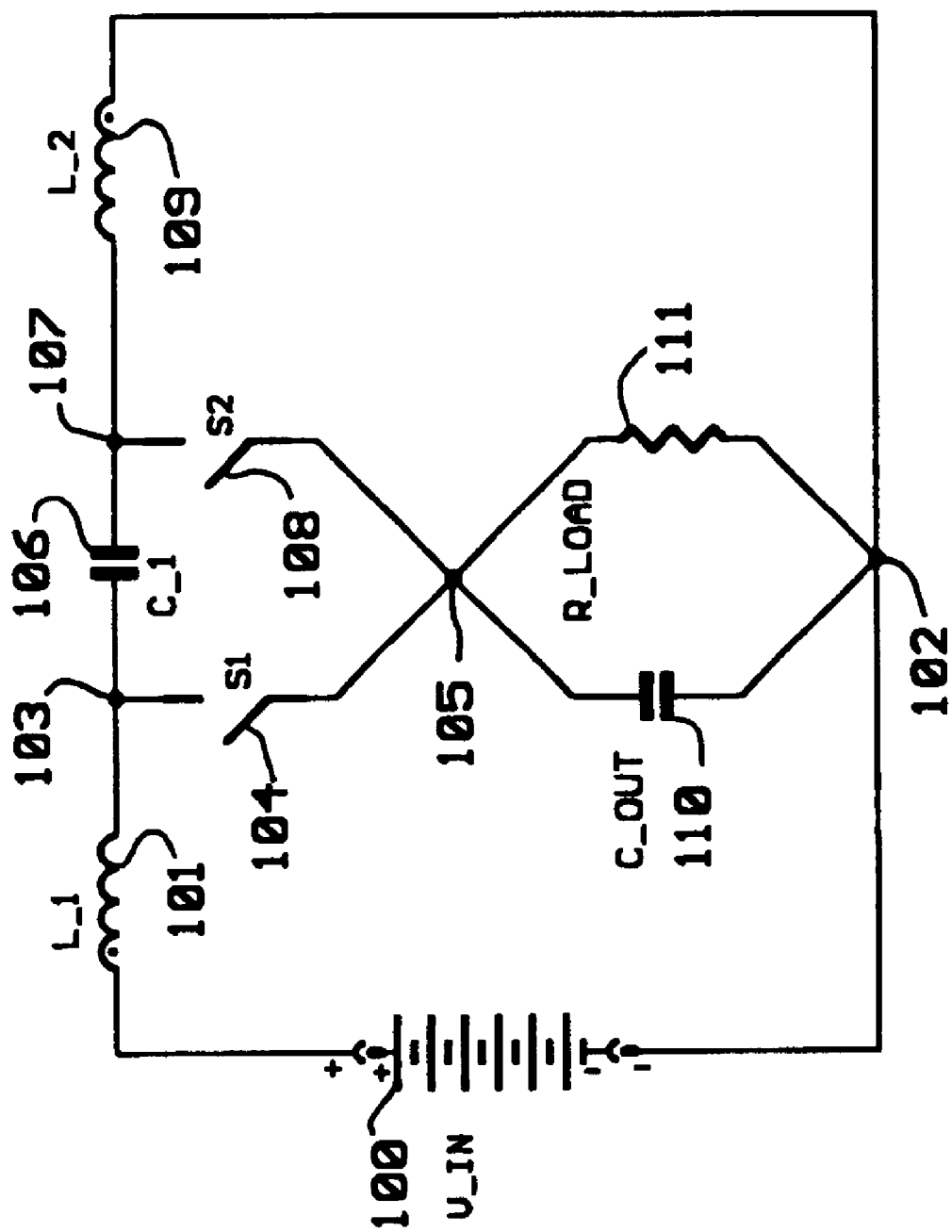
FIG. 4 illustrates a buck type optimal topology converter according to the subject invention.

FIG. 4 illustrates a buck type converter circuit with two inductors and a coupling capacitor connecting the two inductors. The circuit achieves both non-pulsating input current and non-pulsating output current. This fact is not obvious, but it can be seen that the converter can be arranged as a three terminal network, one terminal connecting the switching network to the load positive, one terminal connecting L1 to the source positive, and one terminal connecting L2 to both the source negative and the load negative. Since both of the terminals connected to the inductors must have non-pulsating current then the terminal connected to the load positive must also have non-pulsating current. This result is based on the Law of Conservation of Charge.

Referring to FIG. 4 there is shown a DC to DC converter circuit in which an input DC voltage is converted into an output DC voltage. The circuit requires an input source of substantially DC voltage, a pair of inductors, a pair of switches, and a capacitor coupling the two inductors and the switches. For purposes of the operational state analysis, it is assumed that the coupling capacitor is sufficiently large that the voltage developed across the capacitor is approximately constant over a switching interval and equal to the input DC source voltage. We will also assume for purposes of analysis that the inductors are large so that the current in the inductors is invariant over a switching cycle. Also, for purposes of the operational state analysis, it is assumed that the input DC voltage source has sufficiently low source impedance that the voltage developed across the input DC voltage source is approximately constant over a switching interval. It will finally be assumed that the power switches are ideal; that is, lossless and able to carry current in either direction.

Structure

The structure of the circuit of the subject invention is shown in FIG. 4. A positive terminal of a DC input voltage source 100 is connected to a dotted terminal of an inductor 101. A negative terminal of source 100 is connected to a node 102. An undotted terminal of inductor 101 is connected to a node 103. The node 103 is connected to a first terminal of a capacitor 106 and to a first terminal of a switch 104. A second terminal of switch 104 is connected to a node 105. A second terminal of capacitor 106 is connected to a node 107. A first terminal of a switch 108 is connected to node 107. A second terminal of switch 108 is connected to node 105. An undotted terminal of an inductor 109 is connected to node 107. A dotted terminal of inductor 109 is connected to node 102. A first terminal of a capacitor 110 is connected to node 105. A second terminal of capacitor 110 is connected to node 102. A first terminal of a load 111 is connected to node 105. A second terminal of load 111 is connected to node 102.

Operation

Figure 5:
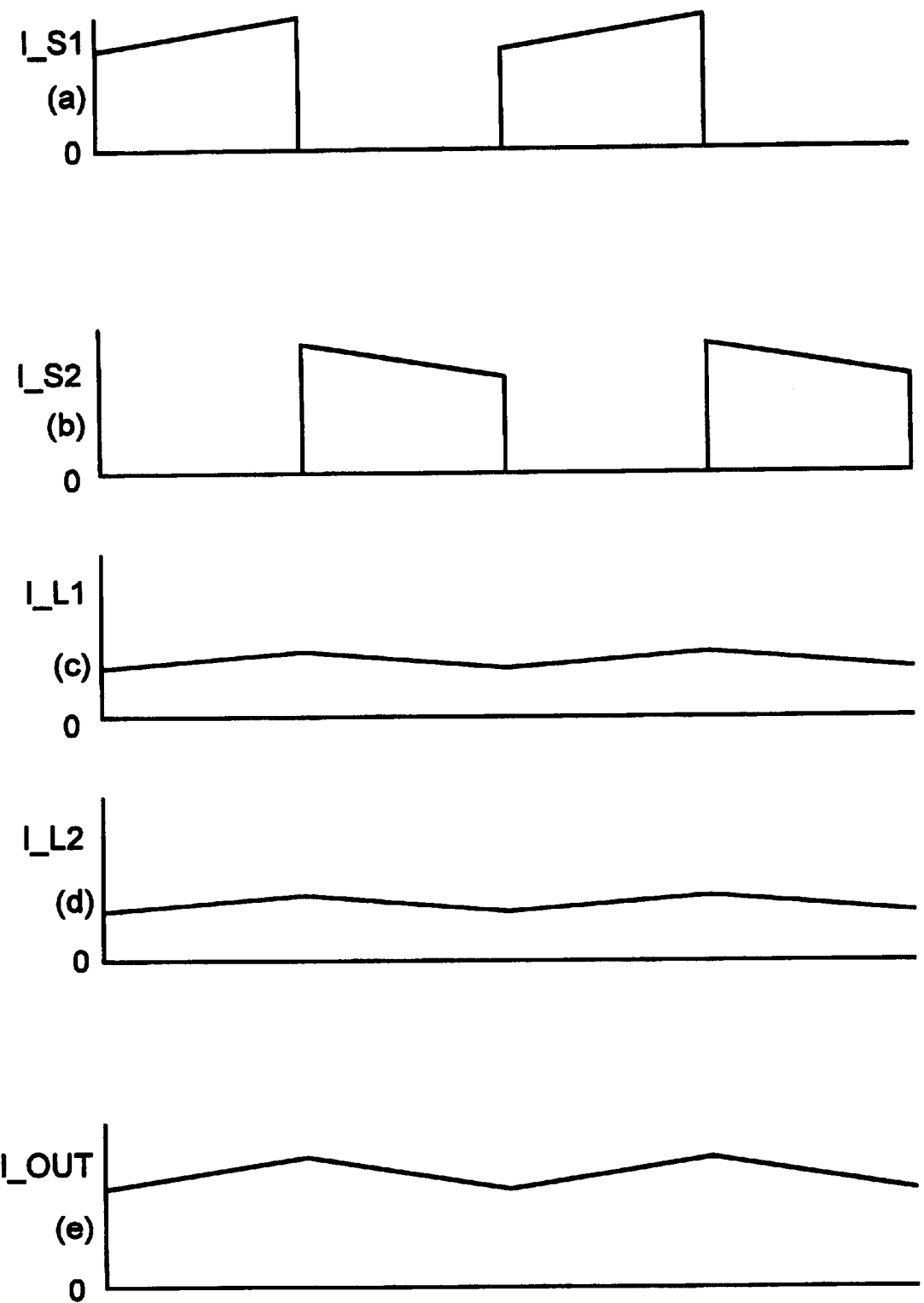
FIG. 5a illustrates the current wave form for the main switch of the FIG. 4 circuit.
FIG. 5b illustrates the current wave form for the second switch of the FIG. 4 circuit.
FIG. 5c illustrates the current wave form for the L1 inductor of the FIG. 4 circuit. The L1 current is also the input current of the converter.
FIG. 5d illustrates the current wave form for the L2 inductor of the FIG. 4 circuit.
FIG. 5e illustrates the wave form for the output current of the FIG. 4 circuit. The output current is the sum of the two inductor currents.
Figure 6:
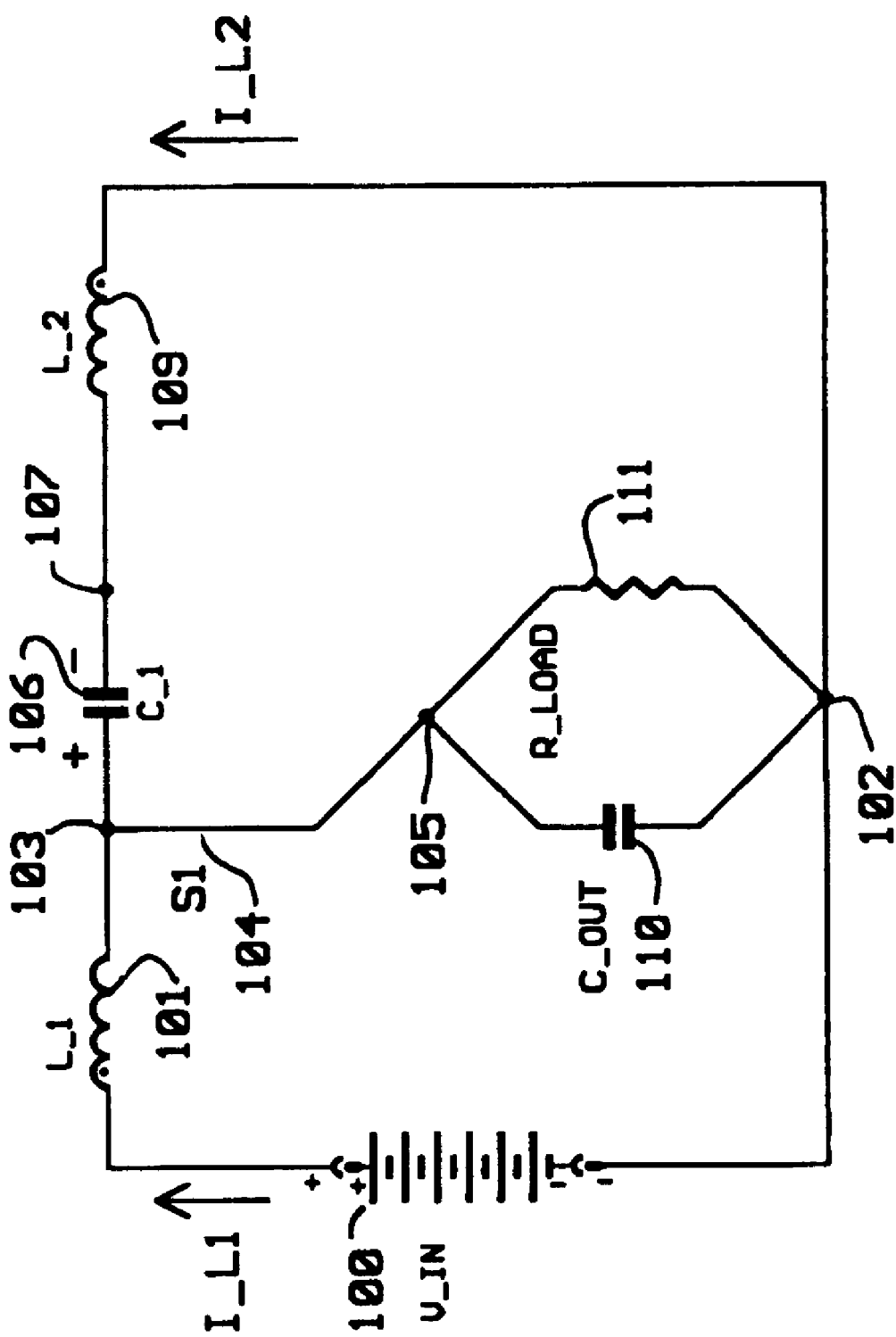
FIG. 6 illustrates the on state of the FIG. 4 circuit.
Figure 7:
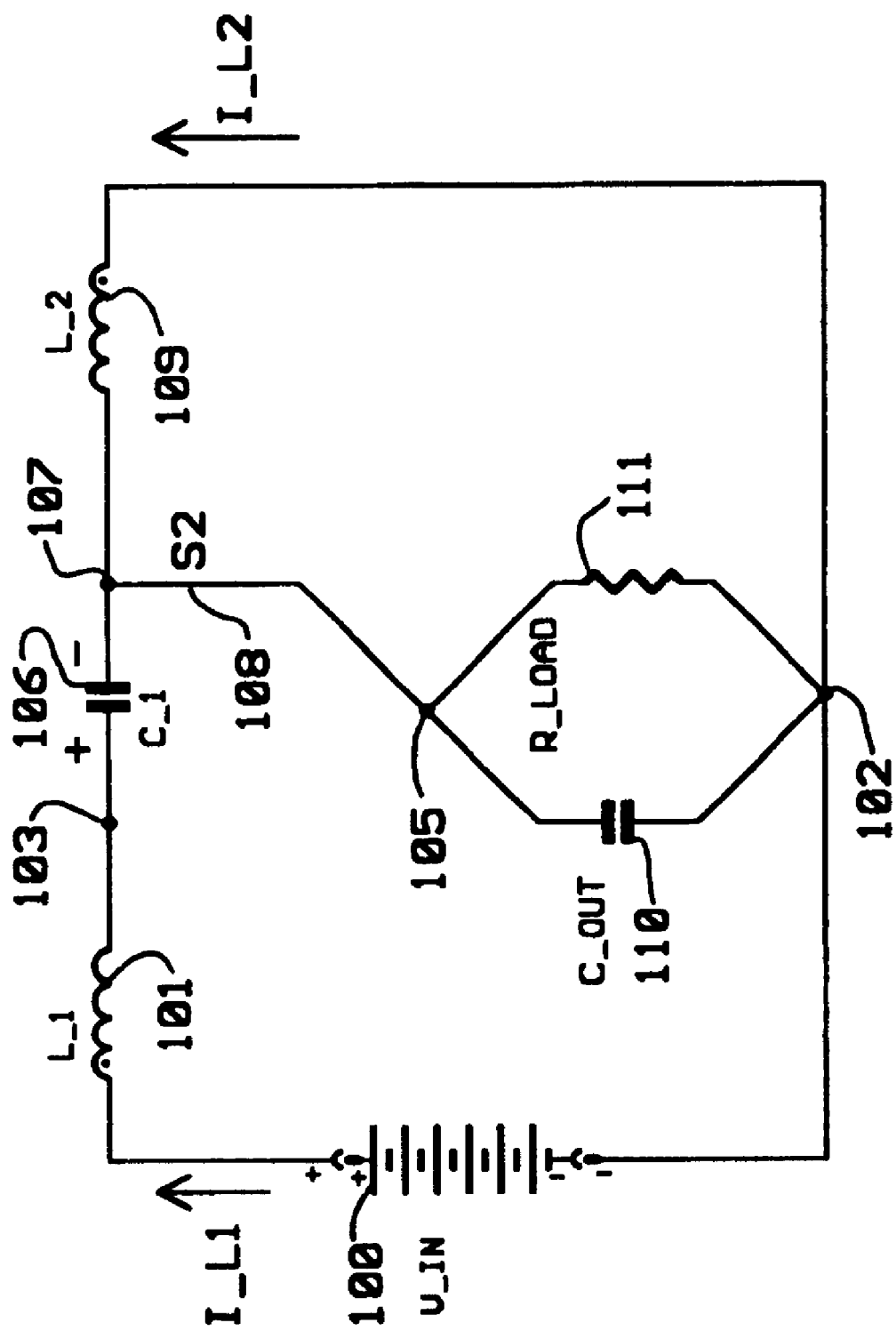
FIG. 7 illustrates the off state of the FIG. 4 circuit.

It is assumed in this analysis that the system has reached a settled operating condition. Except for the short, but finite, switching intervals there are two states of the circuit of FIG. 4, an on state and an off state. Consider an initial condition as illustrated in FIG. 7. The initial condition represents the on state. During the initial condition the switch 104 is on (closed) and the switch 108 is off (open). The current wave forms are illustrated in FIGS. 5a and 5b. The current in the inductor 101 is flowing from left to right into the dotted terminal and out of the undotted terminal. The current in the inductor 109 is flowing from right to left into the dotted terminal and out of the undotted terminal. The inductor current wave forms are illustrated in FIGS. 5c and 5d. The current in both inductors will be increasing in value during the on state. Since the switch 108 is off (open) the current in the capacitor 106 will be equal to the current in the inductor 109. The voltage of the first terminal of capacitor 106 is equal to the load voltage so the voltage at the undotted terminal of the inductor 109 will be negative with respect to the voltage at the dotted terminal of the inductor 109. The current flowing through the switch 104 is equal to the sum of the currents in the inductors 101 and 109. The switch 104 current is equal to the current in the load network consisting of capacitor 110 and load 111. The current in the load network is illustrated in FIG. 5e. Notice that the load network current is equal to the sum of the two inductor currents and also equal to the sum of the two switch currents. At a time determined by the control circuit the switches change states so that switch 104 is off (open) and switch 108 is on (closed). The circuit is now in the off state as illustrated in FIG. 7. The currents in the inductors 101 and 109 are the same as they were at the end of the on state, but now the current in the capacitor 106 reverses direction and becomes equal to the current in the inductor 101. The current in the switch 108 is equal to the sum of the currents in the inductors 101 and 109. The load network current will be equal to the switch 108 current. Since the switch transition time is very small and the current in an inductor cannot be rapidly changed the load network current at the beginning of the off state is the same as the load network current at the end of the on state. During the off state the currents in the inductors ramp down since the voltages at their undotted terminals is higher than the voltages at their dotted terminals. When the inductors currents have ramped down to their values at the beginning of the on state the switches change state again and the cycle repeats.

During the on state the applied voltage on the inductor 101 is just equal to the input voltage minus the output voltage, just as in the standard buck converter. For the inductor 109 the applied voltage during the on state is equal to the capacitor 106 voltage minus the output voltage. During the off state the voltage applied to the inductor 101 is equal to the output voltage plus the capacitor 106 voltage minus the input voltage and the voltage applied to the inductor 109 is equal to the output voltage. From Faraday's Law of Induction we know that in the steady state the sum of the volt second products applied to each inductor over a full cycle of operation must equal to zero. For the inductor 101 we can say that $$0=(V_{IN}-V_{OUT})\cdot D\cdot T-(V_{OUT}+V_{C1}-V_{IN})\cdot(1-D)\cdot T, \quad (1)$$

and for the inductor 109 we can say that $$0=(V_{C1}-V_{OUT})\cdot D\cdot T-V_{OUT}\cdot(1-D)\cdot T, \quad (2)$$

where $V_{IN}$ is the DC source voltage, $V_{OUT}$ is the load voltage, D is the duty cycle, T is the period, and $V_{C1}$ is the voltage applied to the capacitor 106. Solving equations (1) and (2) for $V_{OUT}$ and $V_{C1}$ yields $$V_{OUT}=D\cdot V_{IN} \quad (3)$$

and $$V_{C1}=V_{IN}. \quad (4)$$

The input power will be $$P_{IN}=V_{IN}\cdot I_{L1} \quad (5)$$

and the output power will be $$P_{OUT}=V_{OUT}\cdot I_{OUT} \quad (6)$$

where $P_{OUT}$ is the output power, $P_{IN}$ is the input power, $I_{L1}$ is the input current which is also the inductor 101 current, and $I_{OUT}$ is the load network current. The load network current is also equal to the switch current which is also equal to the sum of the inductor currents or $$I_{OUT}=I_{L1}+I_{L2} \quad (7)$$

where $I_{L2}$ is the current in the inductor 109.

Setting $P_{OUT}=P_{IN}$ and combining equations 3, 5, 6, and 7 and solving for $I_{L1}$ and $I_{L2}$, we get $$I_{L1}=D \cdot I_{OUT} \quad (8)$$

and $$I_{L2}=(1-D) \cdot I_{OUT}. \quad (9)$$

The results given by equations 3, 8, and 9 indicate that the inductor current is a function of line and load voltage because of the duty cycle dependence. When the input and output voltages are nearly equal almost all of the load current flows in the L1 inductor 101 and the current in the L2 inductor 109 is near zero. When the output voltage is much less than the input voltage almost all of the load current flows in the L2 inductor 109 and only a small fraction of the load current flows in the L1 inductor 101.

Related Embodiments

Figure 8:
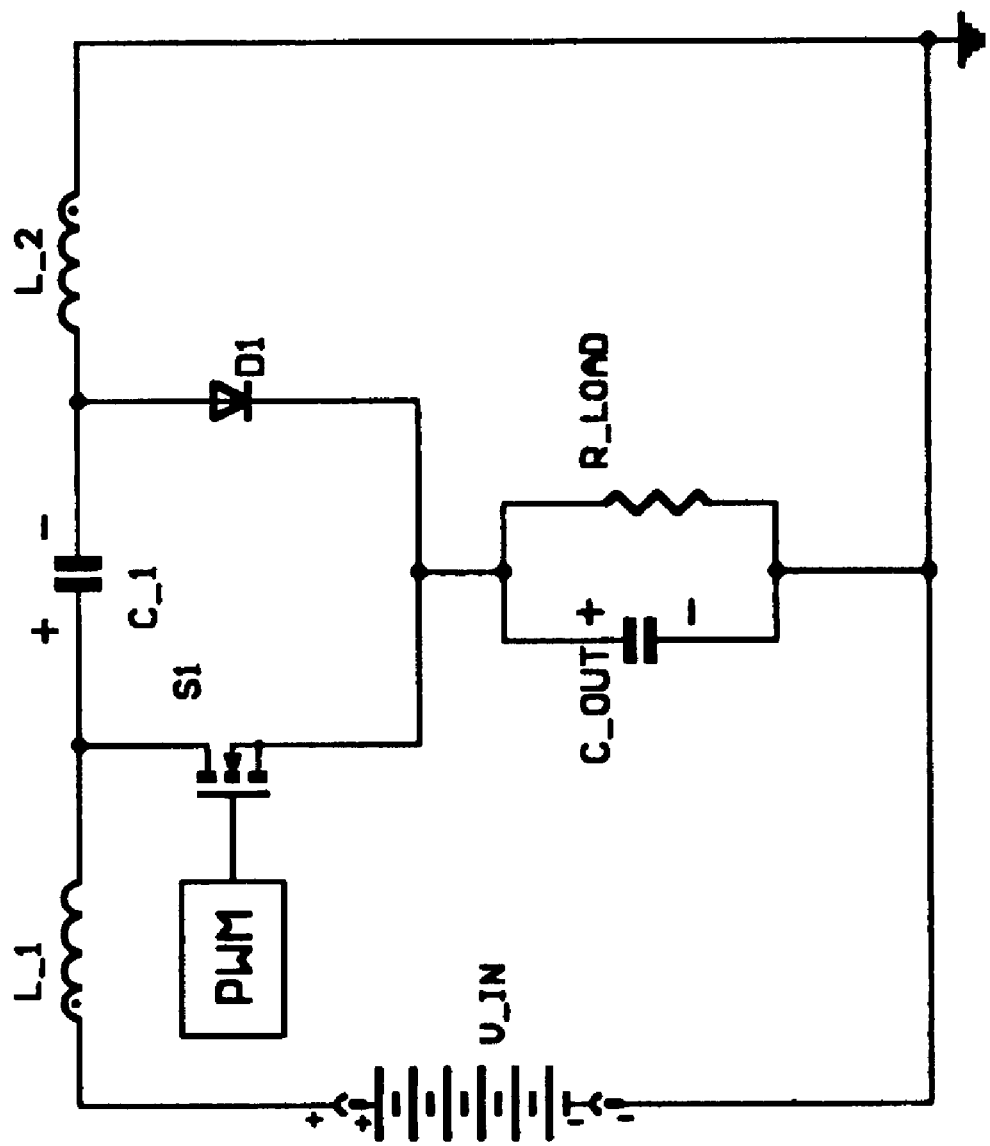
FIG. 8 illustrates an embodiment of the FIG. 4 circuit in which the main switch is implemented with a power mosfet and the second switch is implemented with a diode.

FIG. 8 illustrates an embodiment of the FIG. 4 circuit in which the S1 switch 104 is implemented with a power mosfet and the S2 switch 108 is implemented with a diode.

Figure 9:
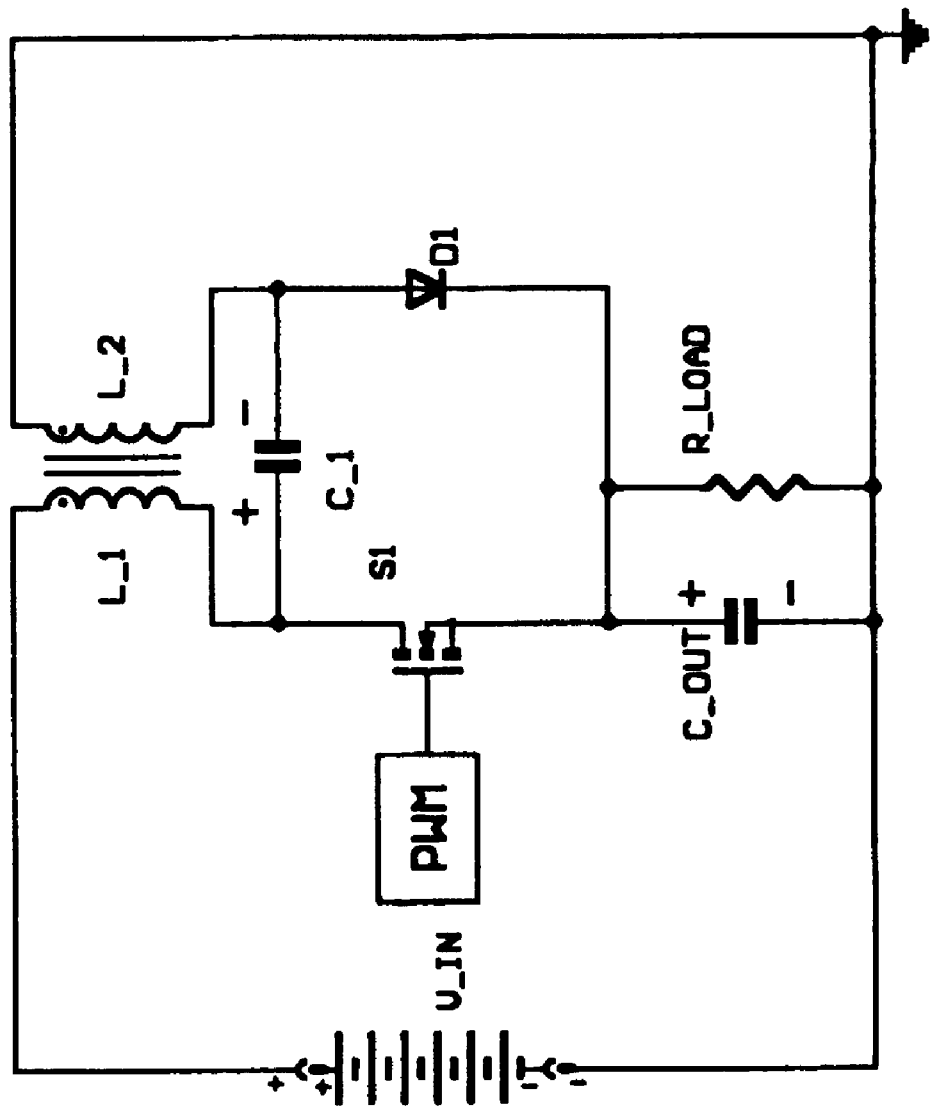
FIG. 9 illustrates an embodiment of the FIG. 4 circuit in which the two inductors are combined in a coupled inductor on a common core.

FIG. 9 illustrates another embodiment of the FIG. 4 circuit in which the two inductors are combined on a single magnetic core. Notice that the dotted terminals of the two inductors are both connected to AC grounds, i.e., points of DC potential where the AC voltage is invariant. Notice also that the two undotted terminals are connected to opposing terminals of a capacitor which is sufficiently large that, in the steady state, the capacitor's voltage is invariant. Because of the capacitor connection at the undotted terminals the AC wave form at each undotted terminal is identical so that we can conclude that the AC wave form of each inductor is identical which suggests that the two inductors can readily be combined on a common core with a high degree of magnetic coupling. The magnetic coupling suggests another possibility, that of ripple current elimination at one terminal. In this case it would be desirable to eliminate the current ripple in the L1 inductor. Eliminating the ripple in the L2 inductor can also be accomplished but the benefits of eliminating the L2 ripple are not obvious. Consider the on state where the applied voltage to the L1 inductor is the difference between the input source voltage and the output voltage and the voltage applied to the L2 inductor is the same as the L1 inductor from equations 1, 2, and 4. A coupled inductor model as described by J. K. Watson in his book "Applications of Magnetics" on pages 270–273 is used here. We can model the two magnetic elements as a coupled inductor or transformer with mutual inductance, M, open circuit inductance on the L1 side equal to $L_{11}$, open circuit inductance on the L2 side equal to $L_{22}$, coupling coefficient equal to k, and leakage inductance on the L1 side equal to $l_1$. Let us further define the time rate of change of the L1 inductor current to be $I_{d1}$, and the time rate of change of the L2 current to be $I_{d2}$. Also let us define the voltage difference between the input and output to be $$V_{Diff}=V_{IN}-V_{OUT}.$$

During the on state for the L1 side of the coupled magnetic we know that $$V_{Diff}=L_{11} \cdot I_{d1}+M \cdot I_{d2} \quad (10)$$

and for the L2 side $$V_{Diff}=L_{22} \cdot I_{d2}+M \cdot I_{d1}. \quad (11)$$

Solving equations 10 and 11 for $I_{d1}$ we get $$I_{d1} = V_{Diff} \cdot \frac{(L_{22} - M)}{(L_{11} \cdot L_{22} - M^2)}. \quad (12)$$

If we set the numerator equal to zero we have the condition necessary for zero input current ripple, i.e., $$L_{22} = M = k \cdot \sqrt{L_{11} \cdot L_{22}}. \quad (13)$$

If we use the result from Watson's model that $$l_1 = L_{11} \cdot (1-k^2) \quad (14)$$

and equation 13, eliminating k, we get the result for zero input ripple current $$l_1 = L_{11} - L_{22}. \quad (15)$$

Equation 15 expresses the zero ripple condition in terms of readily measurable quantities. In order to obtain the result indicated by equation 15 for zero input ripple current it is necessary to use more turns on the L1 winding than on the L2 winding. The leakage inductance and mutual coupling can be manipulated by altering the relative physical placement of the windings, and, if the two windings are placed on different core legs, then the open circuit inductances and the mutual coupling can be affected by altering the reluctance of the magnetic path connecting the two legs, which can be done by altering a gap in the magnetic path connecting the two legs on which the L1 and L2 windings are placed.

Figure 10:
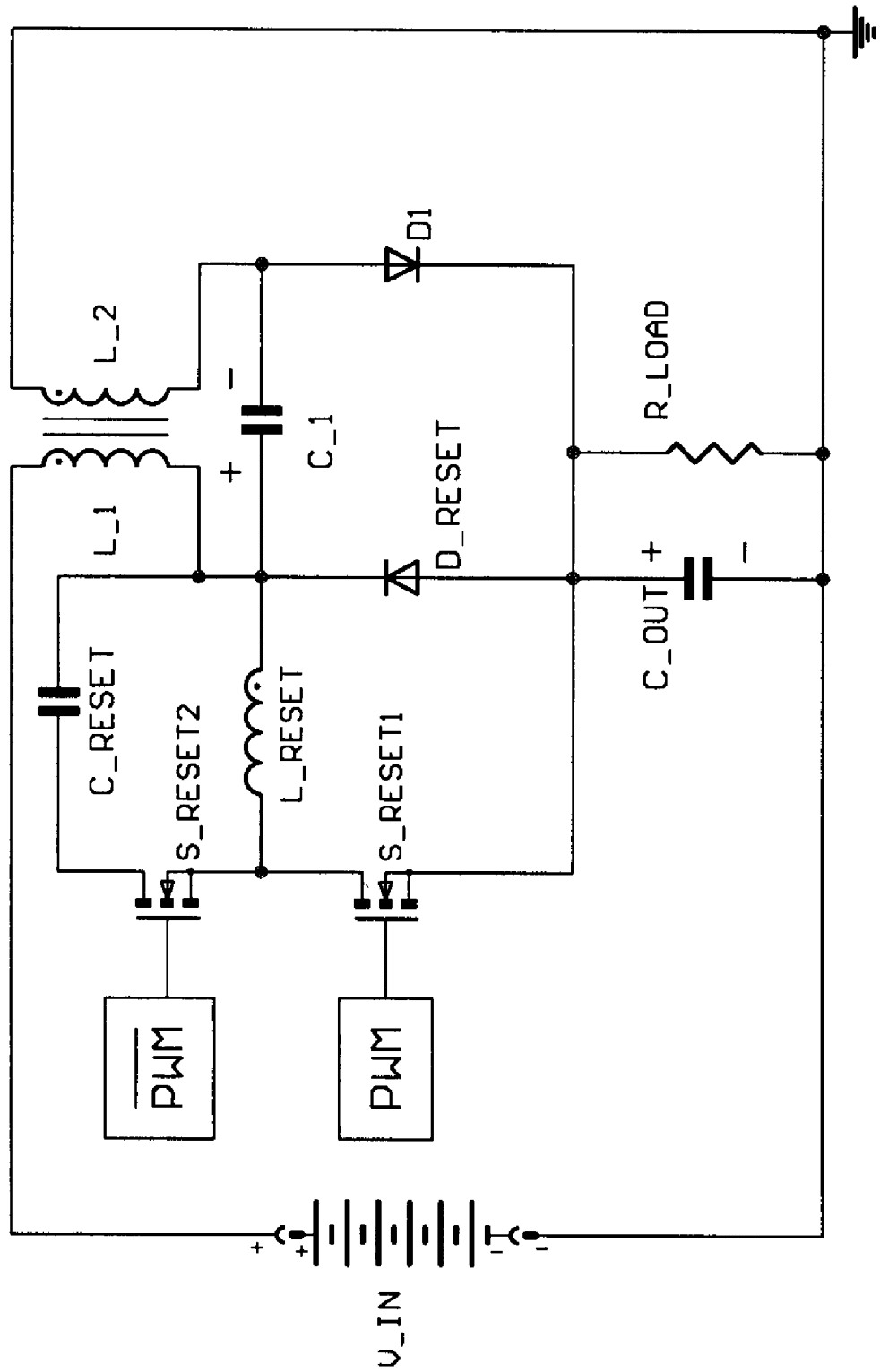
FIG. 10 illustrates an embodiment of the FIG. 4 circuit in which the main switch is replaced by a generalized active reset switching cell to achieve a converter with zero voltage switching for all switches for all transitions.

FIG. 10 illustrates another embodiment similar to the FIG. 9 embodiment in which the switch S1 is replaced by a zero voltage switching active reset switching cell consisting of S1, S2, D2, L_RES, and C_RESET. The operation of the switching cell is described in detail in the patent application entitled "Zero Voltage Switching Active Reset Power Converters" filed on Jun. 5, 2000 by this inventor. The subject of this prior patent application is closely related to the FIG. 10 embodiment and that prior application is incorporated herein.

Figure 11:
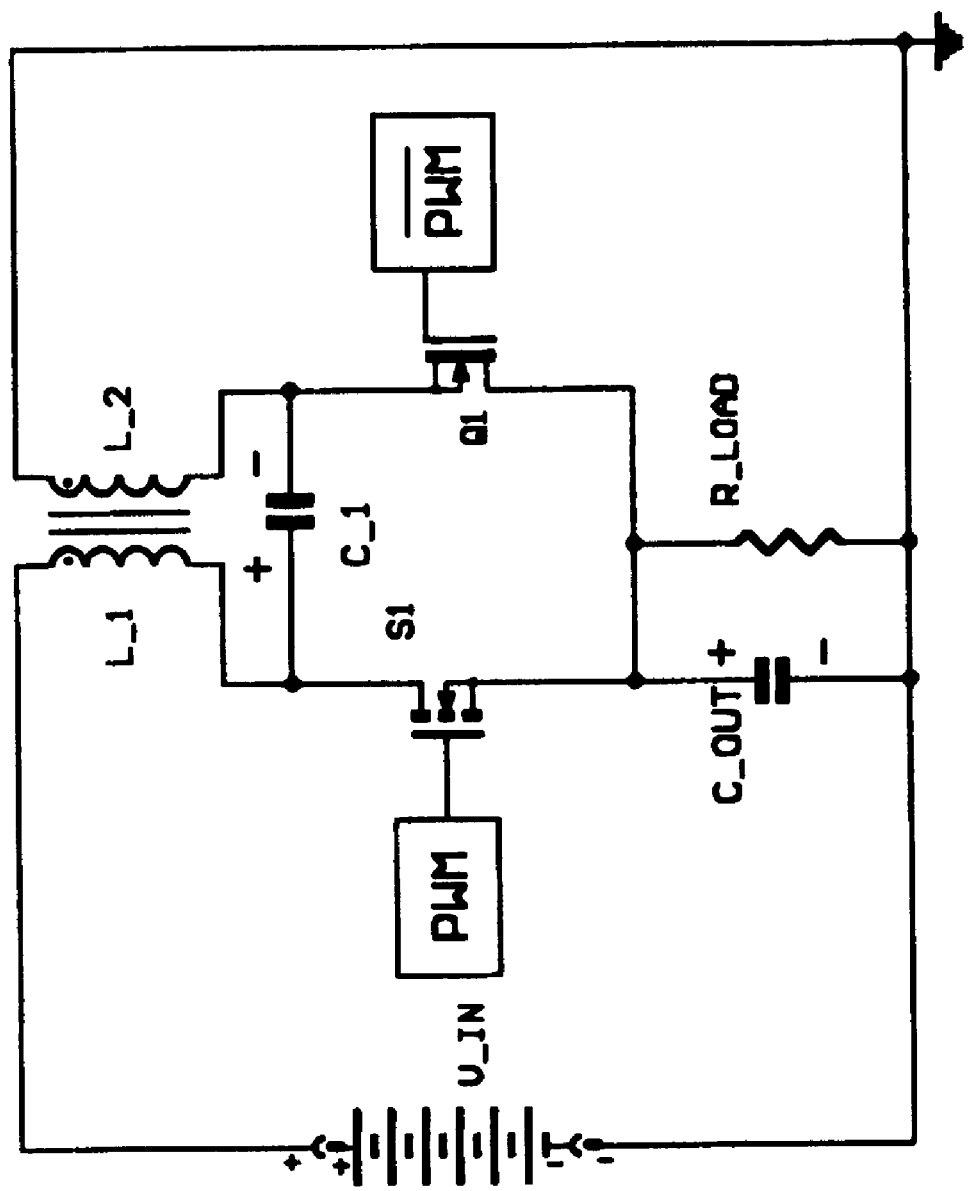
FIG. 11 illustrates an embodiment of the FIG. 4 circuit similar to the FIG. 9 embodiment in which both switches are implemented using power mosfets.

FIG. 11 illustrates another embodiment similar to the FIG. 9 embodiment in which the two switches are both implemented using power mosfets.

Figure 12:
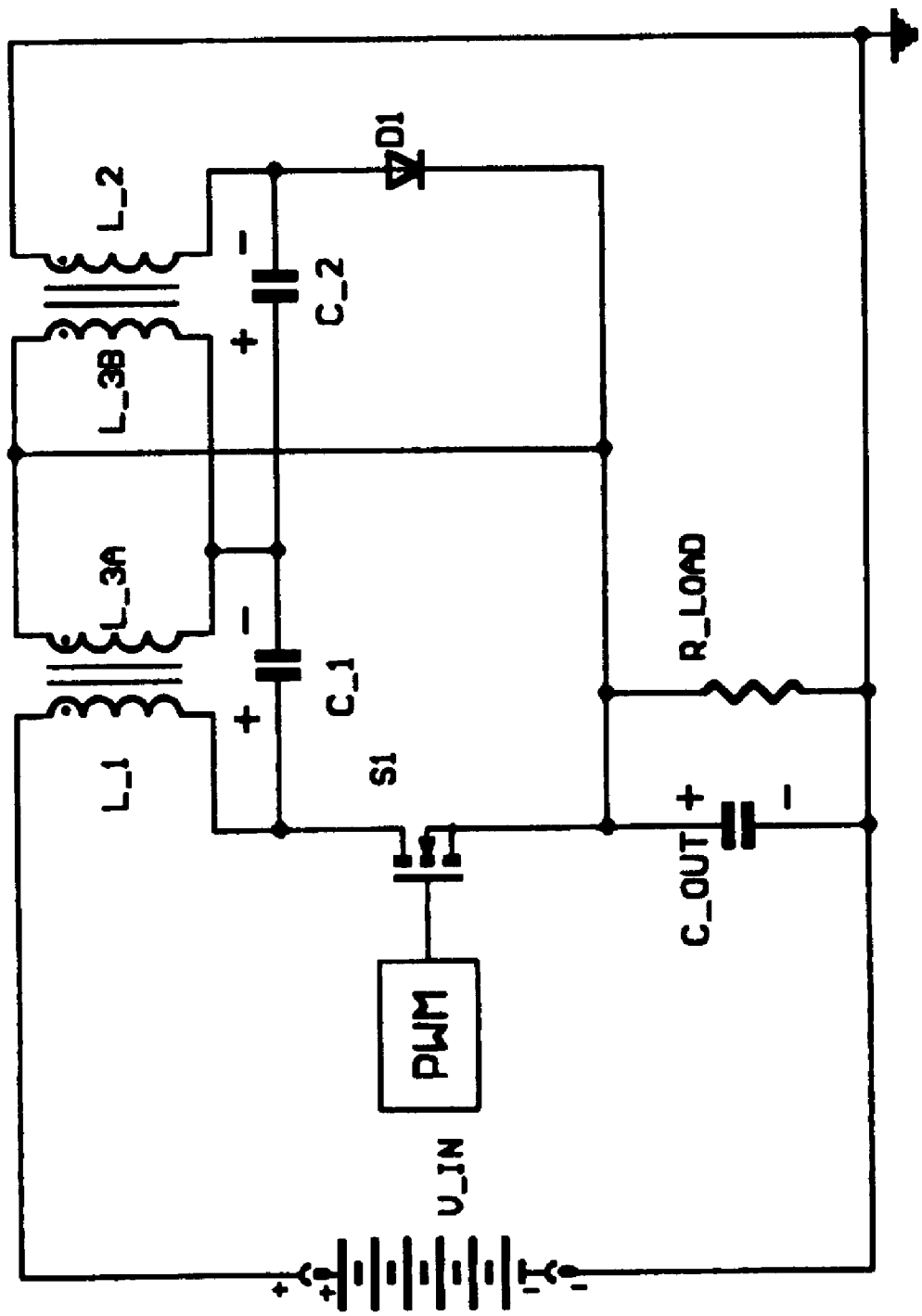
FIG. 12 illustrates an embodiment of the FIG. 4 circuit in which the two inductors are replaced with two coupled inductors and the capacitor is split into two capacitors. By adjusting the coupling coefficient in a specified manner this circuit can achieve zero ripple at both input and output.

FIG. 12 illustrates an embodiment in which the coupling capacitor is split into two capacitors in series and the L1 and L2 inductors each have a second coupled winding attached to the connection point of the two coupling capacitors. With the two coupled inductor arrangement both the L1 ripple current and the L2 ripple current can be made to be zero simultaneously using the same procedure used to obtain the zero input ripple result for the FIG. 9 circuit. Since the converter is a three terminal network and two of the three terminals can have zero ripple then the third terminal can be made to have zero ripple. This result is based on the Law of Conservation of Charge. In this case both the input and the output current can be made to have zero current ripple. The AC winding voltage for all four windings is the same. During the on state the applied voltage is $V_{Diff}$. To obtain zero input ripple we require that $l_1=L_{11}-L_{33A}$, where $L_{33A}$ is the open circuit inductance of the L3A winding which is coupled to the L1 winding. To also obtain zero output ripple we require that $l_2=L_{22}-L_{33B}$, where $L_{33B}$ is the open circuit inductance of the L3B winding which is coupled to L2 and $l_2$ is the leakage inductance of the L2 winding, which is measured with the L3B winding shorted. By obtaining both zero ripple in the L1 winding and zero ripple in the L2 winding we obtain zero ripple at the output since we have a three terminal network and two of the terminals of our three terminal network have zero ripple so that the third terminal, the output, must also have zero ripple.

Figure 13:
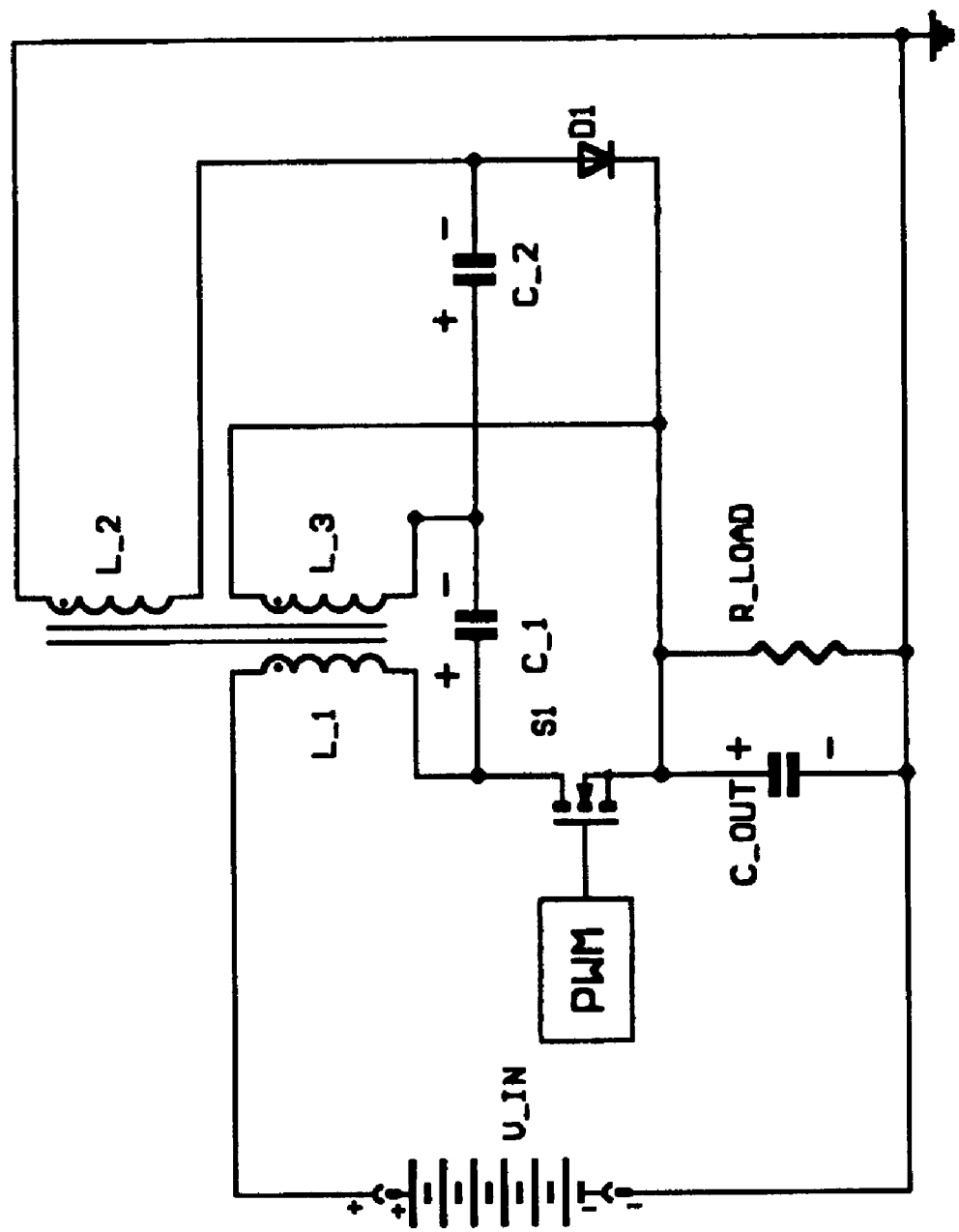
FIG. 13 illustrates an embodiment of the FIG. 4 circuit in which both input and output currents can be made to be zero ripple by suitable choice of leakage inductances and open circuit inductances.
Figure 14:
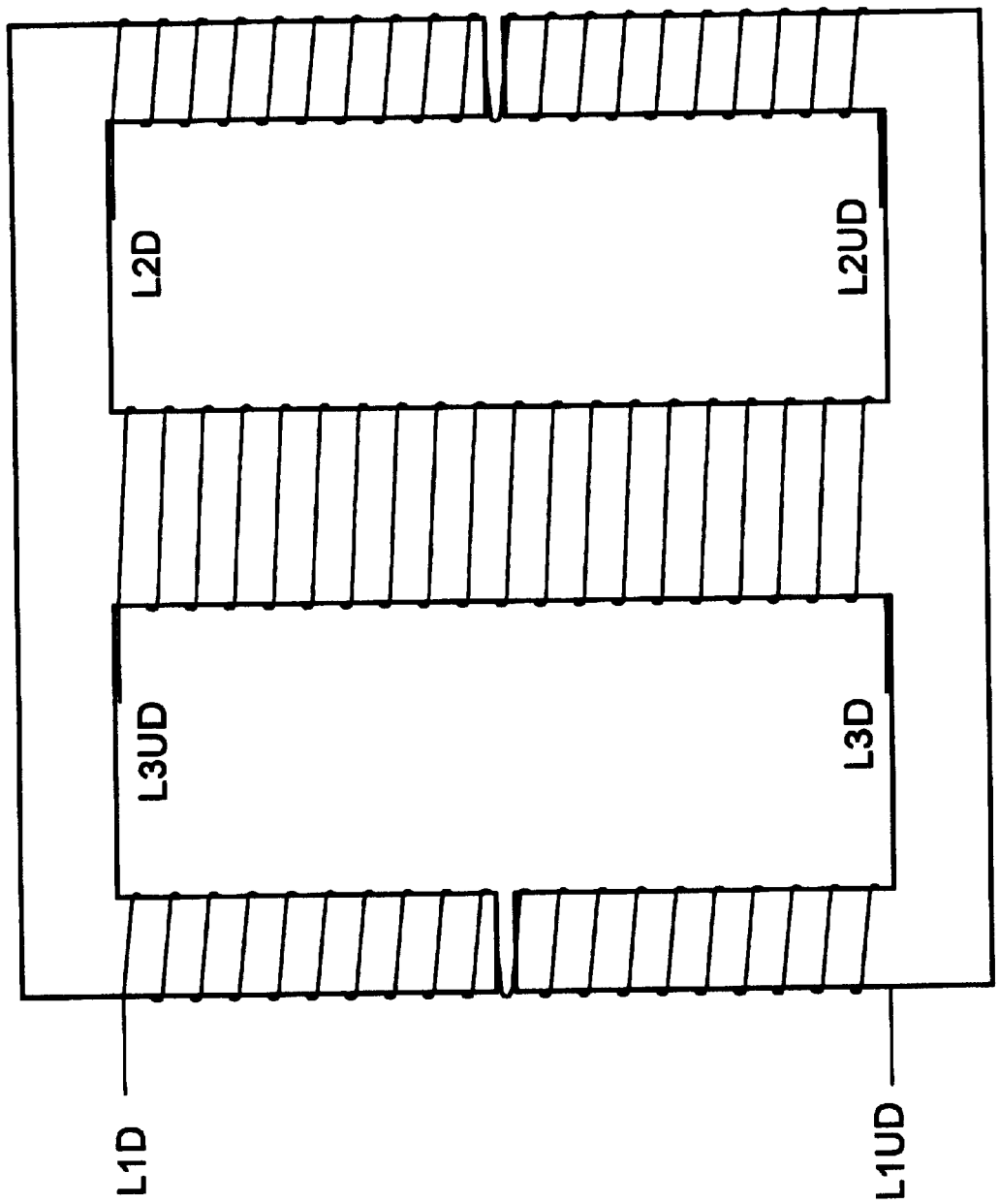
FIG. 14 illustrates a magnetic structure that can accomplish the coupling coefficients necessary to achieve zero ripple at both input and output.

FIG. 13 illustrates an embodiment in which zero input ripple and zero output ripple can simultaneously be obtained using a single core structure as illustrated in FIG. 14. In the FIG. 14 structure the L1 and L2 windings, which are wound on the outer legs, are uncoupled. Both the L1 and L2 windings are coupled to the center post of the core and the L3 winding. The criteria for zero ripple is the same as for the FIG. 12 circuit, but in this case the L3 windings are integrated into a single winding and the two cores are integrated onto a common core with effectively two independent coupled inductors on the same core. Flux generated in the L1 winding will not pass through the L2 winding because of the gap in the right outer leg and the fact that the center post has no gap and thus presents a magnetic short circuit to flux generated in the left outer leg. Similarly flux generated in the L2 winding will pass through the center post but will not pass through the left outer leg because of the gap in the left outer leg. L1D refers to the dotted terminal of the L1 winding, L1UD refers to the undotted terminal of the L1 winding, similarly for the L2 and L3 windings.

Figure 15:
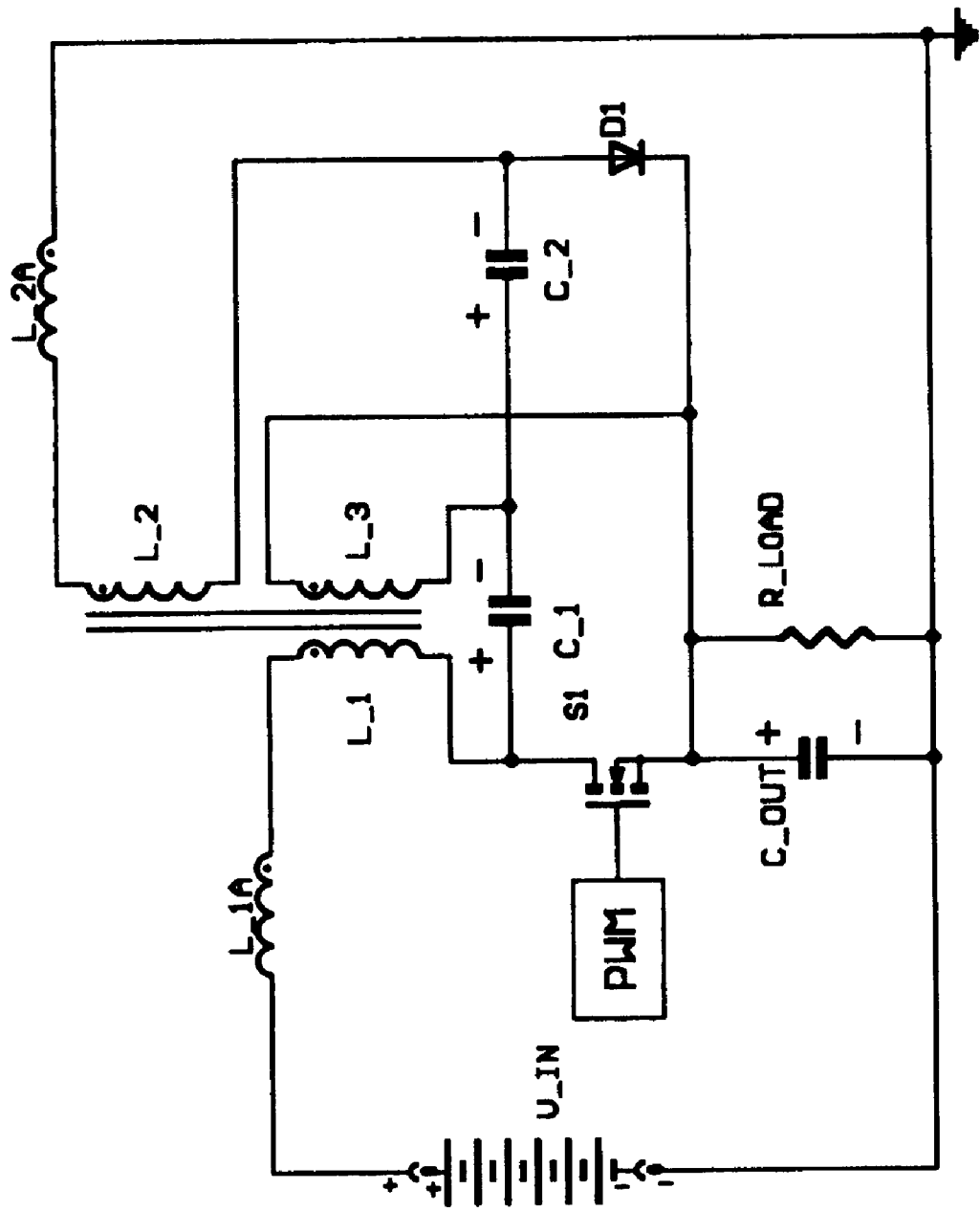
FIG. 15 illustrates an embodiment of the FIG. 4 circuit in which chokes are added that can reduce the input and output ripple currents to near zero.

FIG. 15 illustrates another embodiment similar to the FIG. 13 embodiment but in this case all three windings, L1, L2 and L3, are tightly coupled to each other and have the same number of turns. In this case all three windings can be colocated on the same core leg. Two small inductors are added, L__1A and L__2A, which reduce both the input ripple and output ripple to near zero levels.

Boost Derived Topology

Figure 16:
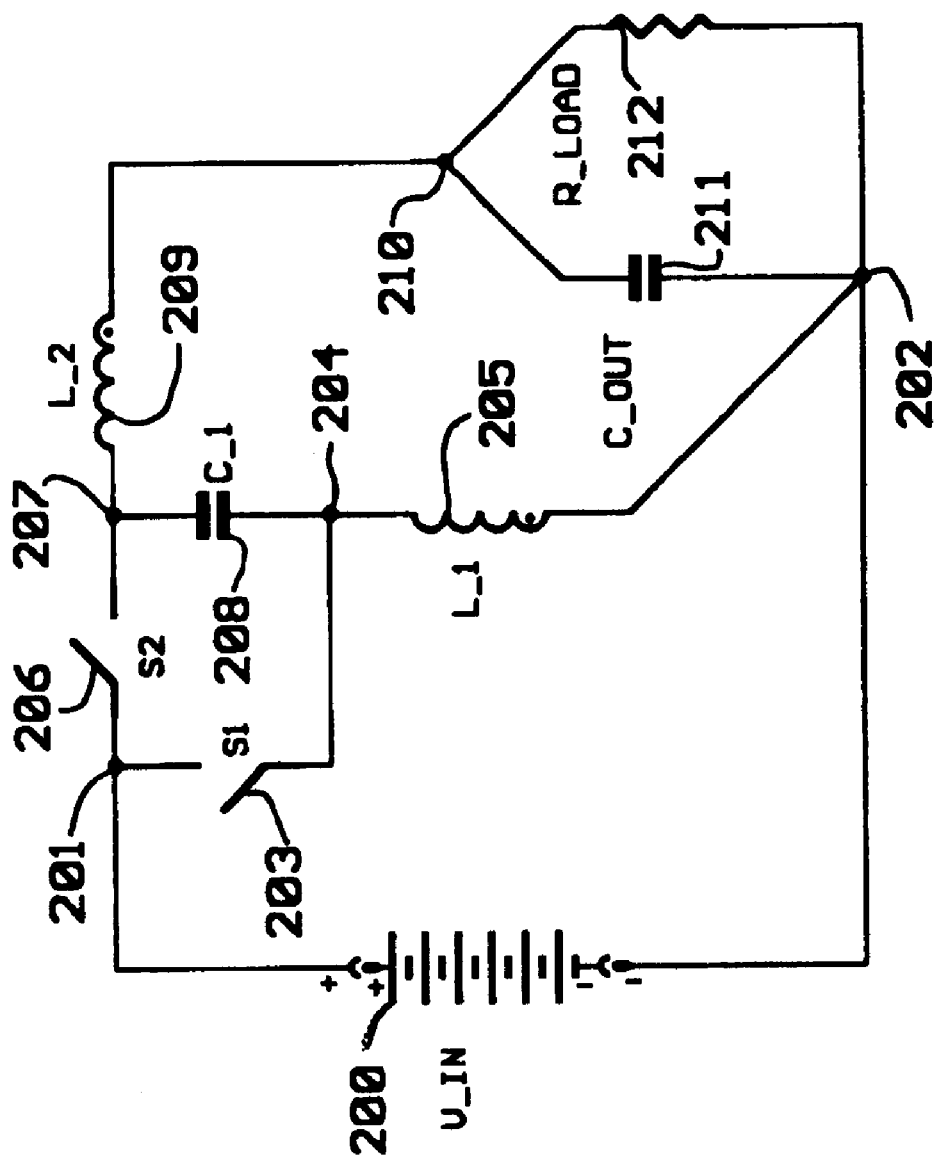
FIG. 16 illustrates a boost type optimal topology converter according to the subject invention.

FIG. 16 illustrates a boost type converter circuit with two inductors and a coupling capacitor connecting the two inductors. The circuit achieves both non-pulsating input current and non-pulsating output current. This fact is not obvious, but it can be seen that the converter can be arranged as a three terminal network, one terminal connecting the switching network to the input source positive, one terminal connecting L2 to the output load positive, and one terminal connecting L1 to both the source negative and the load negative. Since both of the terminals connected to the inductors must have non-pulsating current then the terminal connected to the input source must also have non-pulsating current. This result is based on the Law of Conservation of Charge.

Referring to FIG. 16 there is shown a DC to DC converter circuit in which an input DC voltage is converted into an output DC voltage. The circuit requires an input source of substantially DC voltage, a pair of inductors, a pair of switches, and a capacitor coupling the two inductors and the switches. For purposes of the operational state analysis, it is assumed that the coupling capacitor is sufficiently large that the voltage developed across the capacitor is approximately constant over a switching interval and equal to the output DC load voltage. We will also assume for purposes of analysis that the inductors are large so that the current in the inductors are invariant over a switching cycle. Also, for purposes of the operational state analysis, it is assumed that the input DC voltage source has sufficiently low source impedance that the voltage developed across the input DC voltage source is approximately constant over a switching interval. It will finally be assumed that the power switches are ideal; that is, lossless and able to carry current in either direction.

Structure

The structure of the circuit of the subject invention is shown in FIG. 16. A positive terminal of a DC input voltage source 200 is connected to a node 201. A negative terminal of source 200 is connected to a node 202. A first terminal of a switch 203 is connected to node 201. A second terminal of switch 203 is connected to a node 204. An undotted terminal of an inductor 205 is connected to node 204. A dotted terminal of inductor 205 is connected to the node 202. The node 204 is connected to a first terminal of a capacitor 208. A second terminal of capacitor 208 is connected to a node 207. A first terminal of a switch 206 is connected to node 201. A second terminal of switch 206 is connected to node 207. An undotted terminal of an inductor 209 is connected to node 207. A dotted terminal of inductor 209 is connected to a node 210. A first terminal of a capacitor 211 is connected to node 210. A second terminal of capacitor 211 is connected to node 202. A first terminal of a load 212 is connected to node 210. A second terminal of load 212 is connected to node 202.

Operation

Figure 17:
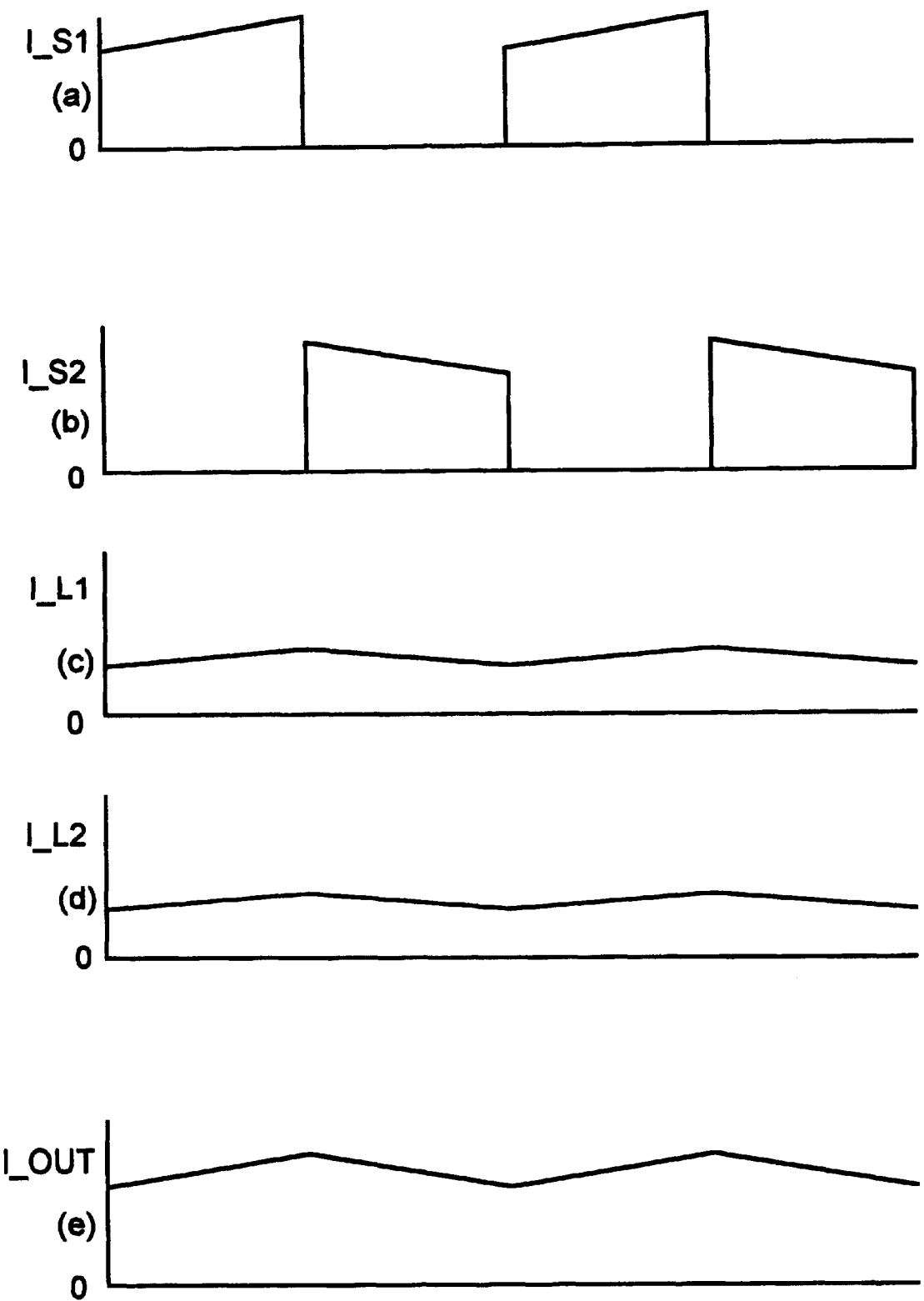
FIG. 17a illustrates the current wave form for the main switch of the FIG. 16 circuit.
FIG. 17b illustrates the current wave form for the second switch of the FIG. 16 circuit.
FIG. 17c illustrates the current wave form for the L1 inductor of the FIG. 16 circuit.
FIG. 17d illustrates the current wave form for the L2 inductor of the FIG. 16 circuit. The L2 current is also the output current of the converter.
FIG. 17e illustrates the wave form for the input current of the FIG. 16 circuit. The input current is the sum of the two inductor currents.
Figure 18:
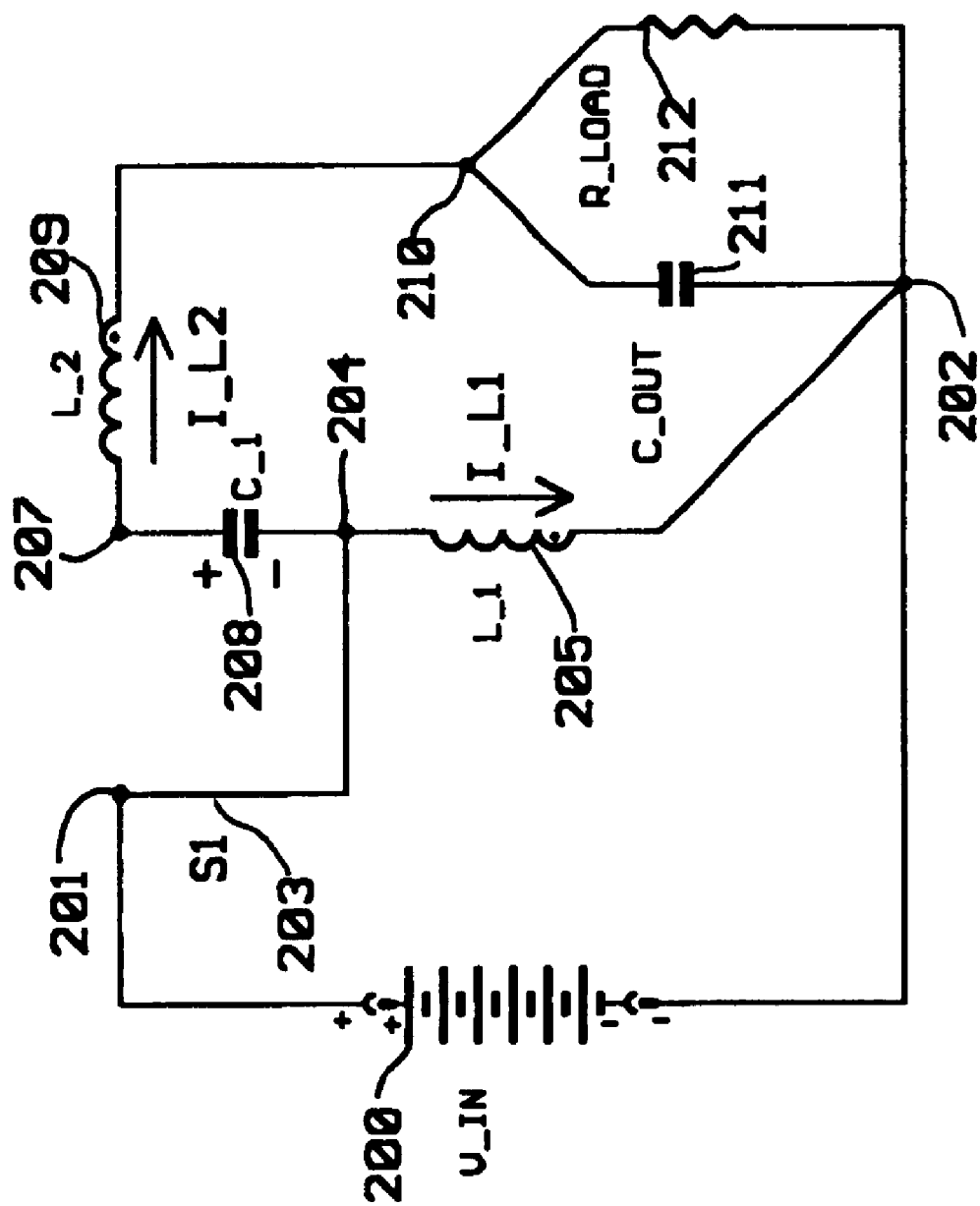
FIG. 18 illustrates the on state of the FIG. 16 circuit.
Figure 19:
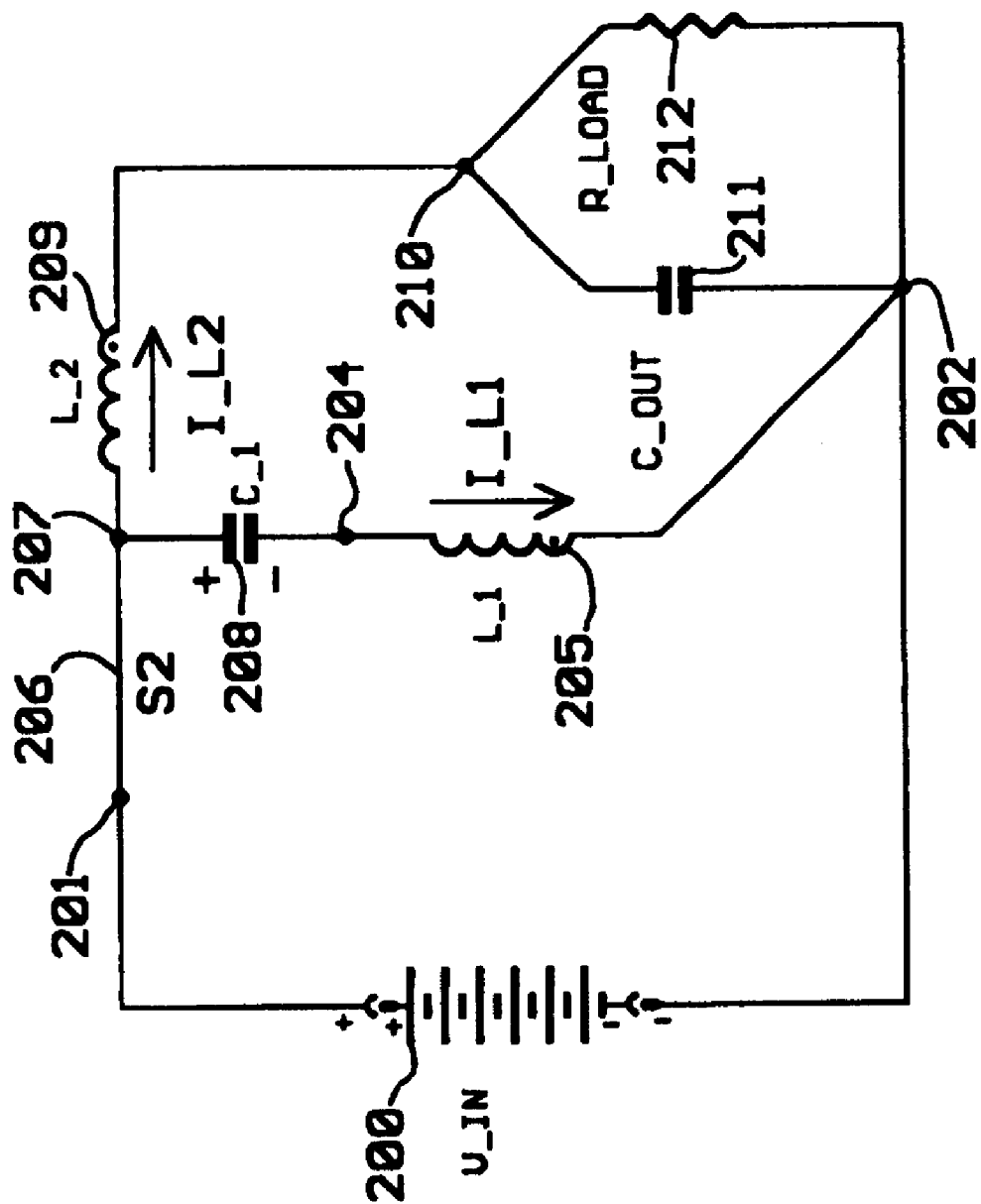
FIG. 19 illustrates the off state of the FIG. 16 circuit.

It is assumed in this analysis that the system has reached a settled operating condition. Except for the short, but finite, switching intervals there are two states of the circuit of FIG. 16, an on state and an off state. Consider an initial condition as illustrated in FIG. 18. The initial condition represents the on state. During the initial condition the switch 203 is on (closed) and the switch 206 is off (open). The current wave forms of the switches are illustrated in FIGS. 17a and 17b. The current in the inductor 205 is flowing from top to bottom into the undotted terminal and out of the dotted terminal. The current in the inductor 209 is flowing from left to right into the undotted terminal and out of the dotted terminal. The inductor current wave forms are illustrated in FIGS. 17c and 17d. The current in both inductors will be increasing in value during the on state. Since the switch 206 is off (open) the current in the capacitor 208 will be equal to the current in the inductor 209. It will be shown that the applied voltage to the capacitor 208 is equal to the output voltage. The voltage at the first terminal of capacitor 208 is equal to the input voltage so the voltage at the undotted terminal of the inductor 209 will be positive with respect to the voltage at the dotted terminal of the inductor 209. The current flowing through the switch 203 is equal to the sum of the currents in the inductors 203 and 209. The switch 203 current is equal to the input source current. The input current is illustrated in FIG. 17e. Notice that the input current is equal to the sum of the two inductor currents and also equal to the sum of the two switch currents. At a time determined by the control circuit the switches change states so that switch 203 is off (open) and switch 206 is on (closed). The circuit is now in the off state as illustrated in FIG. 19. The currents in the inductors 205 and 209 are the same as they were at the end of the on state, but now the current in the capacitor 208 reverses direction and becomes equal to the current in the inductor 205. The current in the switch 206 is equal to the sum of the currents in the inductors 205 and 209. The input current will be equal to the switch 206 current. Since the switch transition time is very small and the current in an inductor cannot be rapidly changed the input current at the beginning of the off state is the same as the input current at the end of the on state. During the off state the currents in the inductors ramp down since the voltages at their dotted terminals is higher than the voltages at their undotted terminals. When the inductors currents have ramped down to their values at the beginning of the on state the switches change state again and the cycle repeats.

During the on state the applied voltage on the inductor 205 is just equal to the input voltage, just as in the standard boost converter. For the inductor 209 the applied voltage during the on state is equal to the input voltage plus the capacitor 208 voltage minus the output voltage. During the off state the voltage applied to the inductor 205 is equal to the input voltage minus the capacitor 208 voltage and the voltage applied to the inductor 209 is equal to the output voltage minus the input voltage. From Faraday's Law of Induction we know that in the steady state the sum of the volt second products applied to each inductor over a full cycle of operation must equal to zero. For the inductor 205 we can say that $$0 = V_{IN} \cdot D \cdot T - (V_{C1} - V_{IN}) \cdot (1-D) \cdot T, \tag{16}$$

and for the inductor 209 we can say that $$0 = (V_{C1} + V_{IN} - V_{OUT}) \cdot D \cdot T - (V_{OUT} - V_{IN}) \cdot (1-D) \cdot T, \tag{17}$$

where $V_{IN}$ is the DC source voltage, $V_{OUT}$ is the load voltage, D is the duty cycle, T is the period, and $V_{C1}$ is the voltage applied to the capacitor 208. Solving equations (16) and (17) for $V_{OUT}$ and $V_{C1}$ yields $$V_{OUT} = \frac{V_{IN}}{(1-D)} \tag{18}$$

and $$V_{C1} = V_{OUT}. \tag{19}$$

The input power will be $$P_{IN} = V_{IN} \cdot I_{IN} \tag{20}$$

and the output power will be $$P_{OUT} = V_{OUT} \cdot I_{OUT} \tag{21}$$

where $P_{OUT}$ is the output power, $P_{IN}$ is the input power, $I_{IN}$ is the input current, and $I_{OUT}$ is the load network current, which is also the inductor 209 current, $I_{L2}$. The input current is also equal to the switch current which is also equal to the sum of the inductor currents or $$I_{IN} = I_{L1} + I_{L2} \tag{22}$$

where $I_{L1}$ is the current in the inductor 205.

Setting $P_{OUT} = P_{IN}$ and combining equations 18, 20, 21, and 22 and solving for $I_{L1}$ and $I_{L2}$, we get $$I_{L1} = D \cdot I_{IN} \tag{23}$$

and $$I_{L2} = (1-D) \cdot I_{IN}. \tag{24}$$

The results given by equations 18, 23, and 24 indicate that the inductor current is a function of line and load voltage because of the duty cycle dependence. When the input and output voltages are nearly equal almost all of the input current flows in the L2 inductor 209 and the current in the L1 inductor 205 is near zero. When the output voltage is much more than the input voltage almost all of the input current flows in the L1 inductor 205 and only a small fraction of the input current flows in the L2 inductor 209.

Related Embodiments

Figure 20:
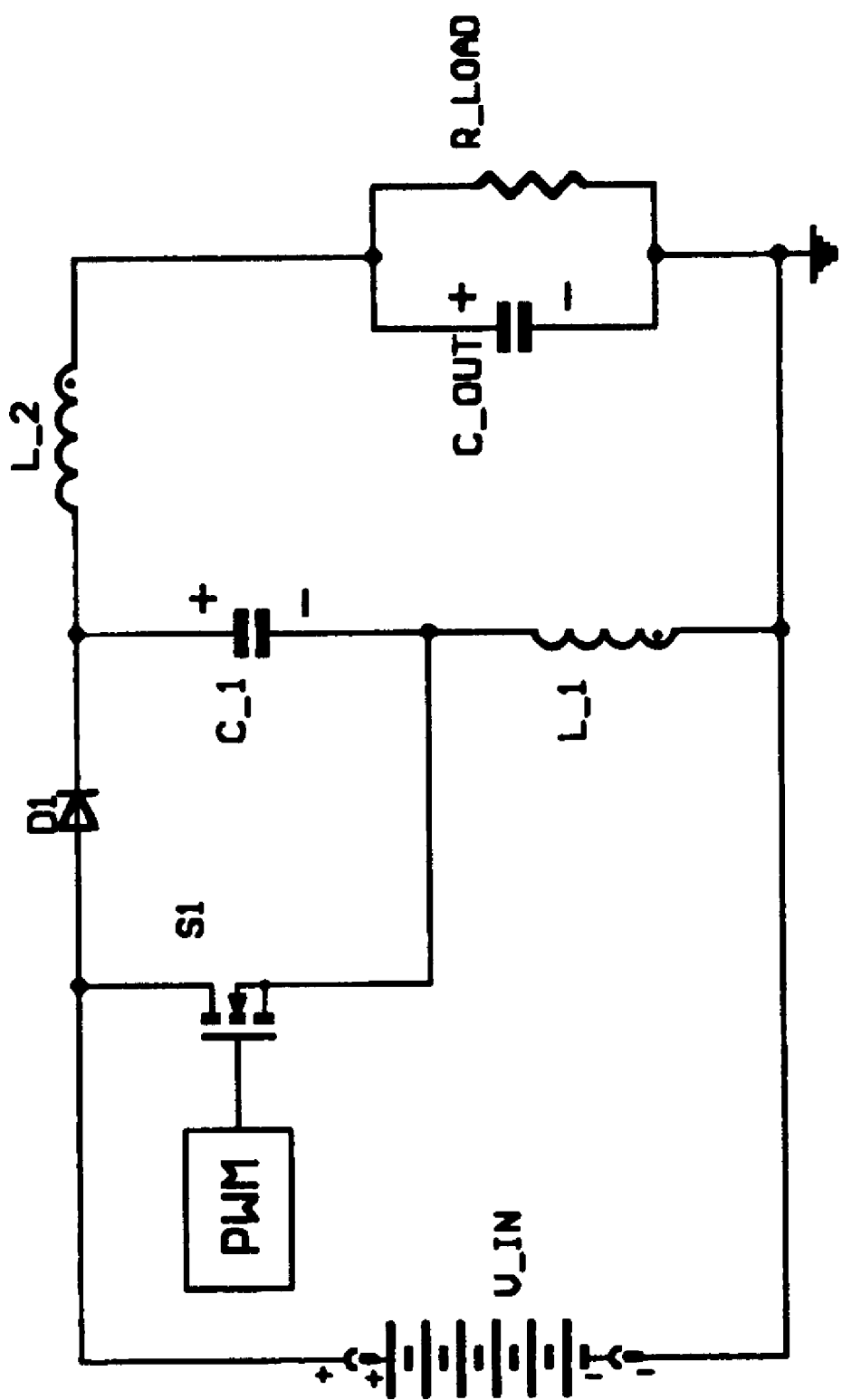
FIG. 20 illustrates an embodiment of the FIG. 16 circuit in which the main switch is implemented with a power mosfet and the second switch is implemented with a diode.

FIG. 20 illustrates an embodiment of the FIG. 16 circuit in which the S1 switch 203 is implemented with a power mosfet and the S2 switch 206, labeled D1 in FIG. 20, is implemented with a diode.

Figure 21:
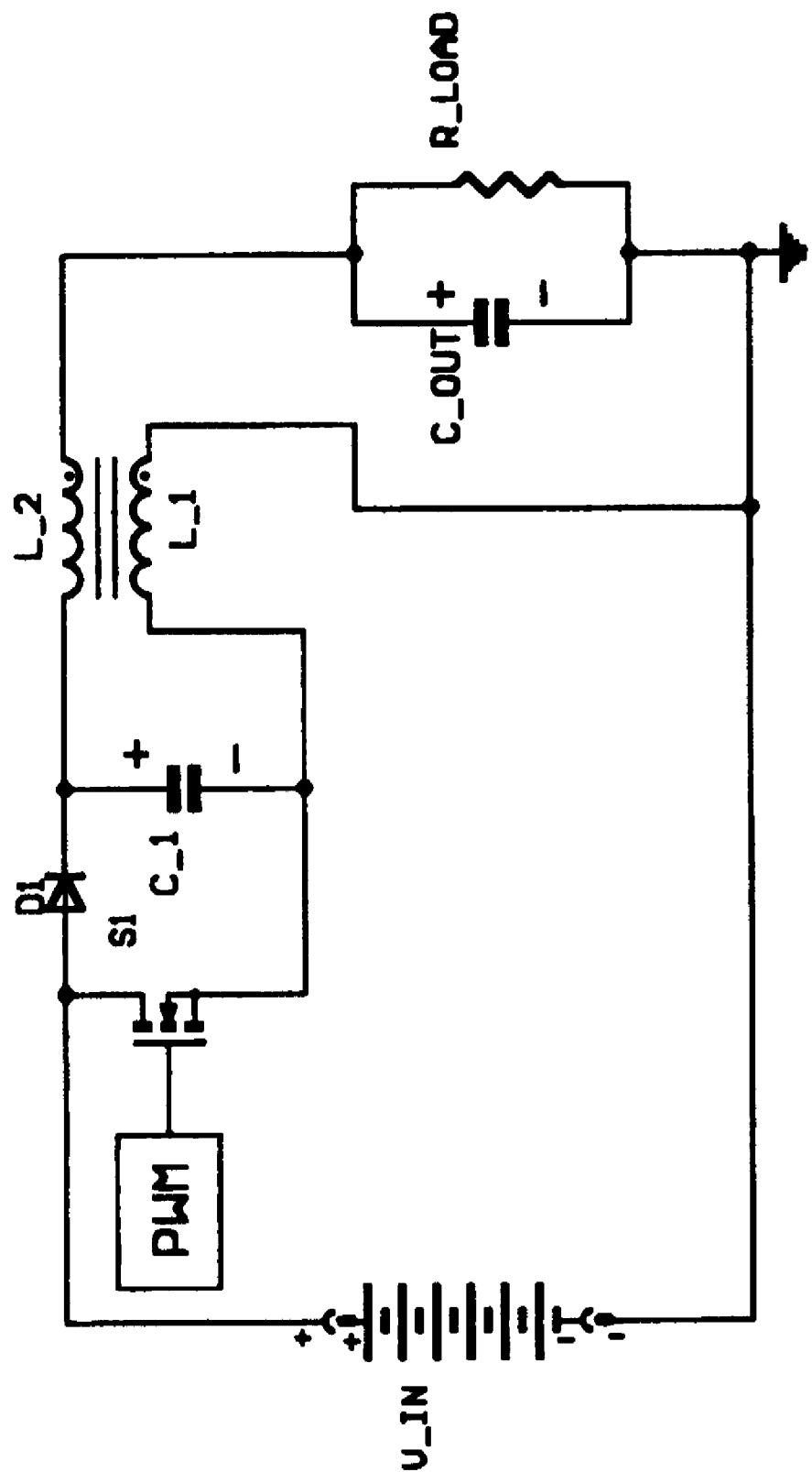
FIG. 21 illustrates an embodiment of the FIG. 16 circuit in which the two inductors are combined in a coupled inductor on a common core.

FIG. 21 illustrates another embodiment of the FIG. 16 circuit in which the two inductors are combined on a single magnetic core. Notice that the dotted terminals of the two inductors are both connected to AC grounds, i.e., points of DC potential where the AC voltage is invariant. Notice also that the two undotted terminals are connected to opposing terminals of a capacitor which is sufficiently large that, in the steady state, the capacitor's voltage is invariant. Because of the capacitor connection at the undotted terminals the AC wave form at each undotted terminal is identical so that we can conclude that the AC wave form of each inductor is identical which suggests that the two inductors can readily be combined on a common core with a high degree of magnetic coupling. The magnetic coupling suggests another possibility, that of ripple current elimination at one terminal. In this case it would be desirable to eliminate the current ripple in the L2 inductor. Eliminating the ripple in the L1 inductor can also be accomplished but the benefits of eliminating the L1 ripple are not obvious. Consider the on state where the applied voltage to the L1 inductor is the input source voltage and the voltage applied to the L2 inductor is the same as the L1 inductor from equations 16, 17, and 19. A coupled inductor model as described by J. K. Watson in his book "Applications of Magnetics" on pages 270–273 is used here. We can model the two magnetic elements as a coupled inductor or transformer with mutual inductance, M, open circuit inductance on the L1 side equal to $L_{11}$, open circuit inductance on the L2 side equal to $L_{22}$, coupling coefficient equal to k, and leakage inductance on the L2 side equal to $I_2$. Let us further define the time rate of change of the L1 inductor current to be $I_{d1}$, and the time rate of change of the L2 inductor current to be $I_{d2}$. During the on state for the L1 side of the coupled magnetic we know that $$V_{IN} = L_{11} \cdot I_{d1} + M \cdot I_{d2} \tag{25}$$

and for the L2 side $$V_{IN} = L_{22} \cdot I_{d2} + M \cdot I_{d1}. \tag{26}$$

Solving equations 25 and 26 for $I_{d2}$ we get $$I_{d2} = V_{IN} \cdot \frac{(L_{11} - M)}{(L_{11} \cdot L_{22} - M^2)}. \tag{27}$$

If we set the numerator equal to zero we have the condition necessary for zero output current ripple, i.e., $$L_{11} = M = k \cdot \sqrt{L_{11} \cdot L_{22}}. \tag{28}$$

If we use the result from Watson's model that $$l_2 = L_{22} \cdot (1 - k^2) \tag{29}$$

and equation 28, eliminating k, we get the result for zero output ripple current $$l_2 = L_{22} - L_{11}. \tag{30}$$

Equation 30 expresses the zero ripple condition in terms of readily measurable quantities. In order to obtain the result indicated by equation 30 for zero output ripple current it is necessary to use more turns on the L2 winding than on the L1 winding. The leakage inductance and mutual coupling can be manipulated by altering the relative physical placement of the windings, and, if the two windings are placed on different core legs, then the open circuit inductances and mutual coupling can be affected by altering the reluctance of the magnetic path connecting the two legs, which can be done by altering a gap in the magnetic path connecting the two legs on which the L1 and L2 windings are placed.

Figure 22:
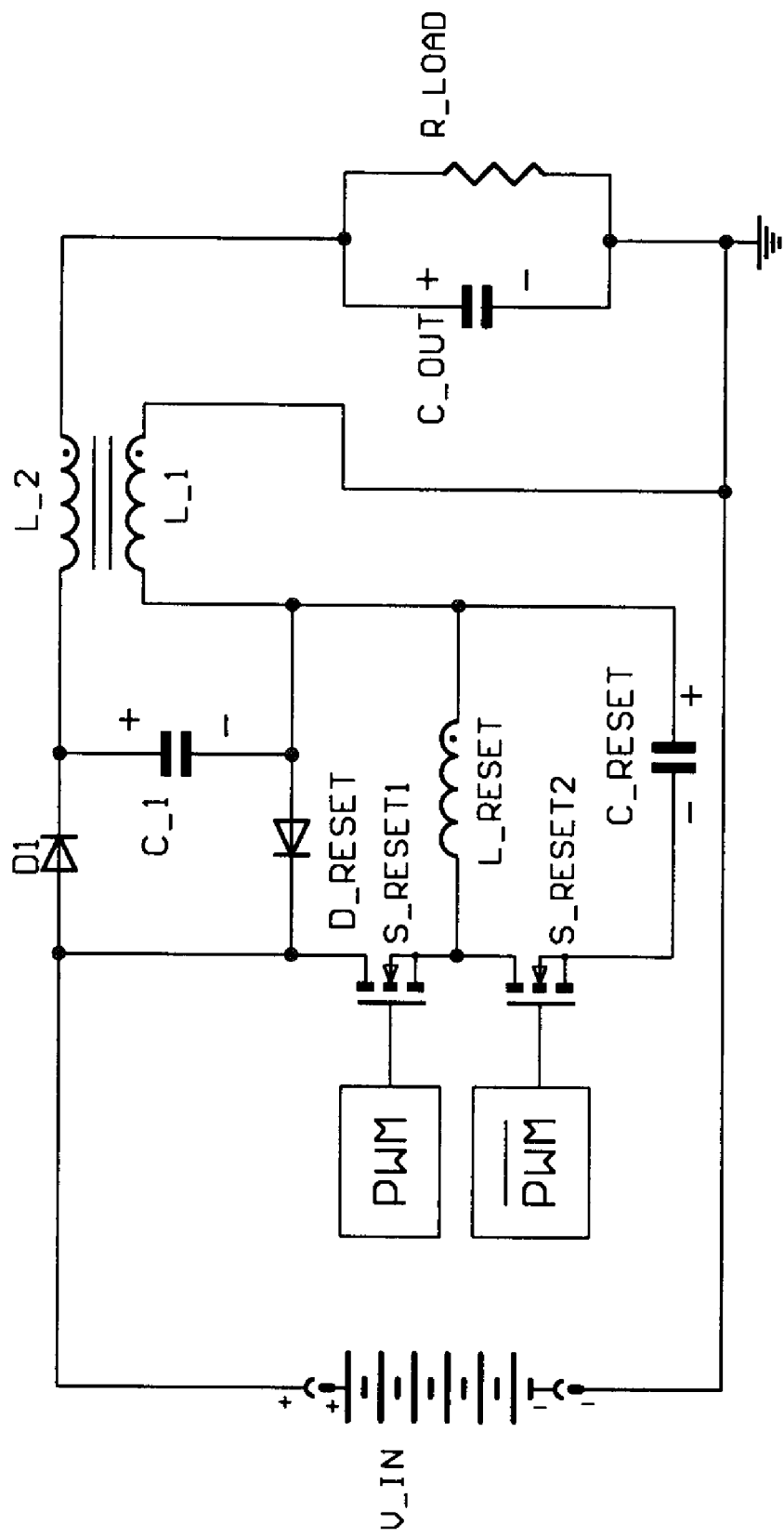
FIG. 22 illustrates an embodiment of the FIG. 16 circuit in which the main switch is replaced by a generalized active reset switching cell to achieve a converter with zero voltage switching for all switches for all transitions.

FIG. 22 illustrates another embodiment similar to the FIG. 21 embodiment in which the switch S1 is replaced by a zero voltage switching active reset switching cell consisting of S1, S2, D2, L_RES, and C_RESET. The operation of the switching cell is described in detail in the patent application entitled "Zero Voltage Switching Active Reset Power Converters" filed on Jun. 5, 2000 by this inventor. The subject of this prior patent application is closely related to the FIG. 22 embodiment and that prior application is incorporated herein.

Figure 23:
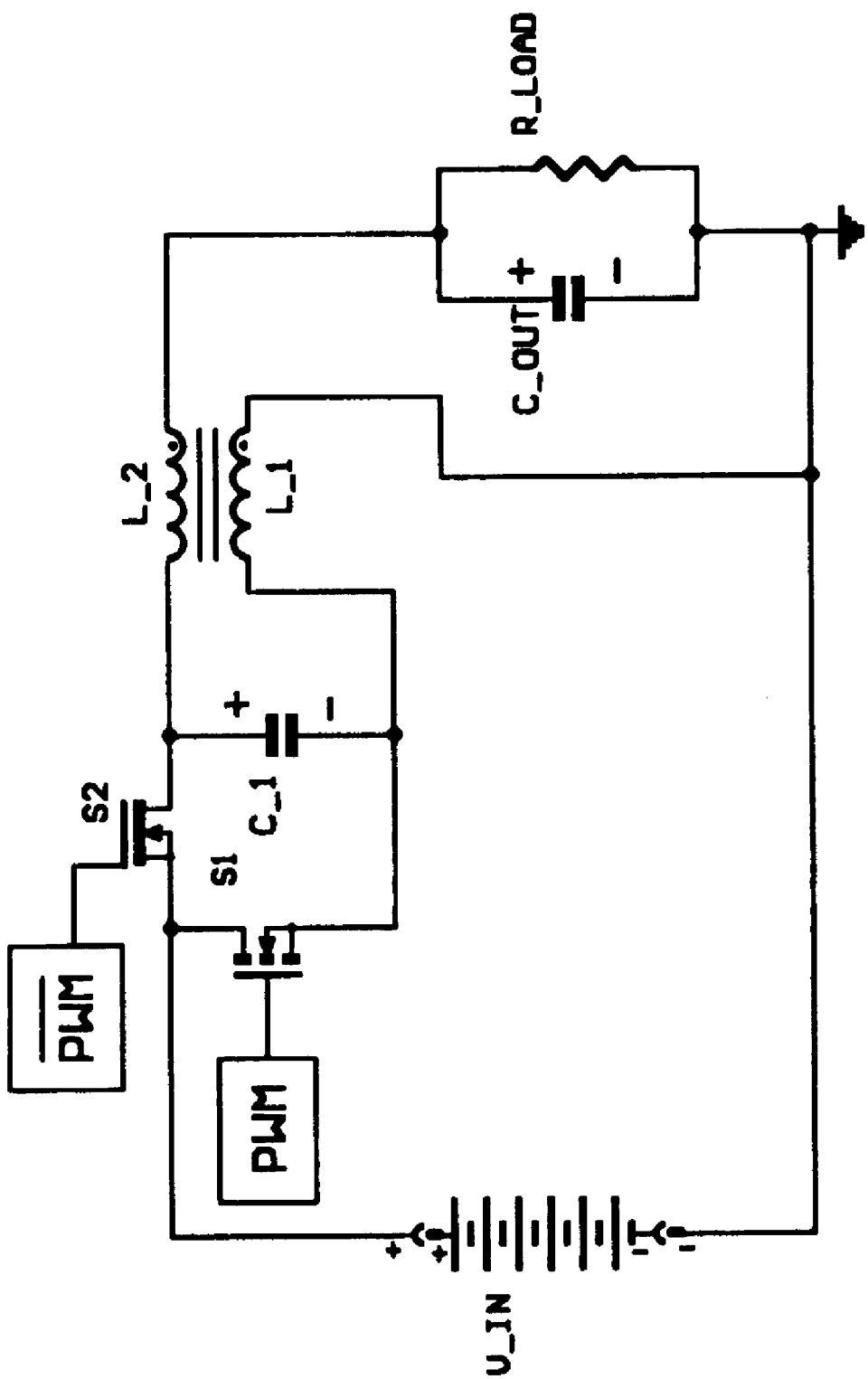
FIG. 23 illustrates an embodiment of the FIG. 16 circuit similar to the FIG. 21 embodiment in which both switches are implemented using power mosfets.

FIG. 23 illustrates another embodiment similar to the FIG. 21 embodiment in which the two switches are both implemented using power mosfets.

Figure 24:
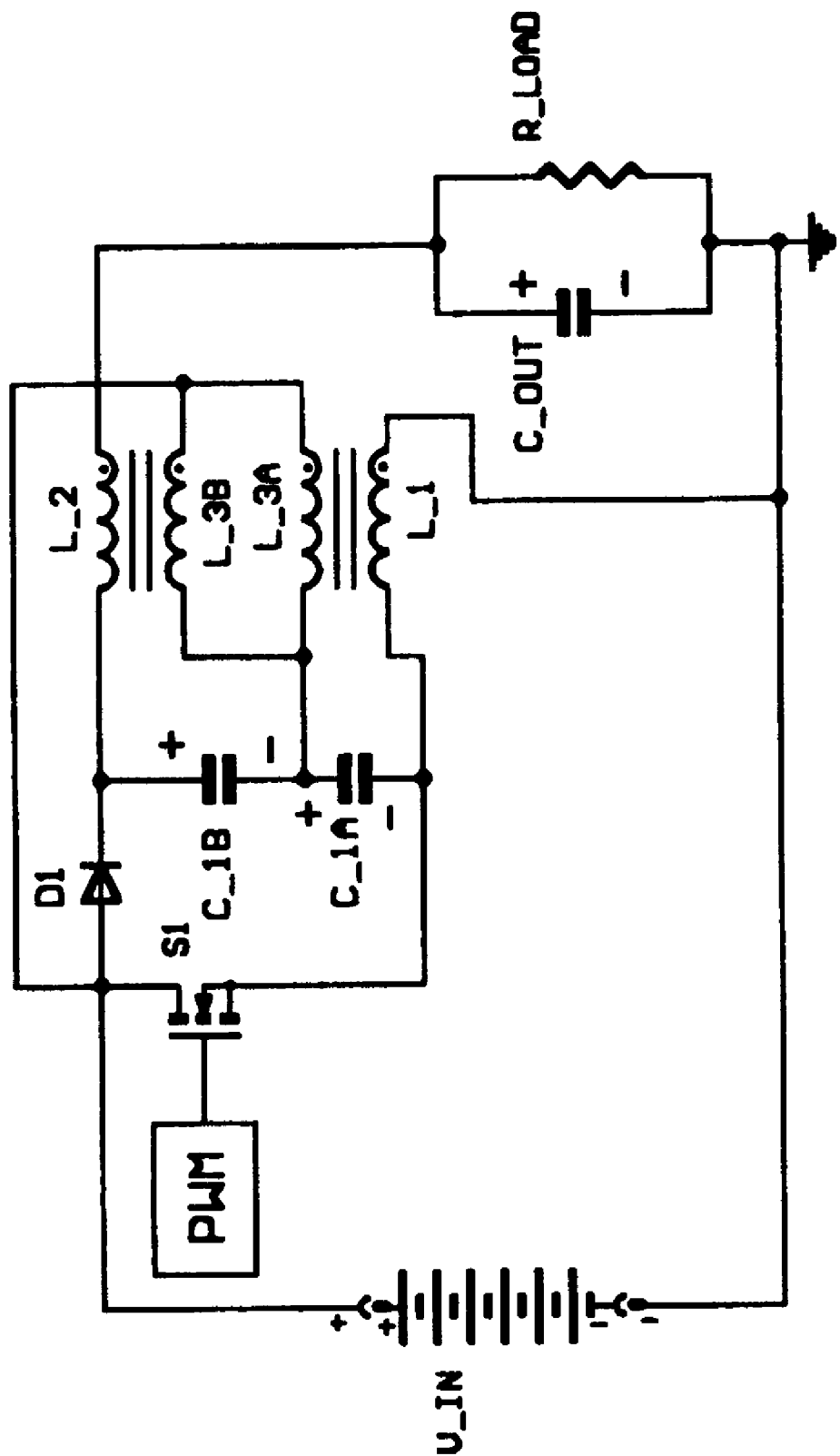
FIG. 24 illustrates an embodiment of the FIG. 16 circuit in which the two inductors are replaced with two coupled inductors and the capacitor is split into two capacitors. By adjusting the coupling coefficient and open circuit inductances in a specified manner this circuit can achieve zero ripple at both input and output.

FIG. 24 illustrates an embodiment in which the coupling capacitor is split into two capacitors in series and the L1 and L2 inductors each have a second coupled winding attached to the connection point of the two coupling capacitors. With the two coupled inductor arrangement both the L1 ripple current and the L2 ripple current can be made to be zero simultaneously using the same procedure used to obtain the zero output ripple result for the FIG. 21 circuit. Since the converter is a three terminal network and two of the three terminals can have zero ripple then the third terminal can be made to have zero ripple when the ripple at the other two terminals is zero. This result is based on the Law of Conservation of Charge. In this case both the input and the output current can be made to have zero current ripple. The AC winding voltage for all four windings is the same. During the on state the applied voltage is $V_{IN}$. To obtain zero output ripple we require that $l_2 = L_{22} - L_{33B}$, where $L_{33B}$ is the open circuit inductance of the L3B winding which is coupled to the L2 winding. To also obtain zero input ripple we require that $l_1 = L_{11} - L_{33A}$, where $L_{33A}$ is the open circuit inductance of the L3A winding which is coupled to L1 and $l_1$ is the leakage inductance of the L1 winding, which is measured with the L3A winding shorted. By obtaining both zero ripple in the L1 winding and zero ripple in the L2 winding we obtain zero ripple at the input since we have a three terminal network and two of the terminals of our three terminal network have zero ripple so that the third terminal, the input, must also have zero ripple.

Figure 25:
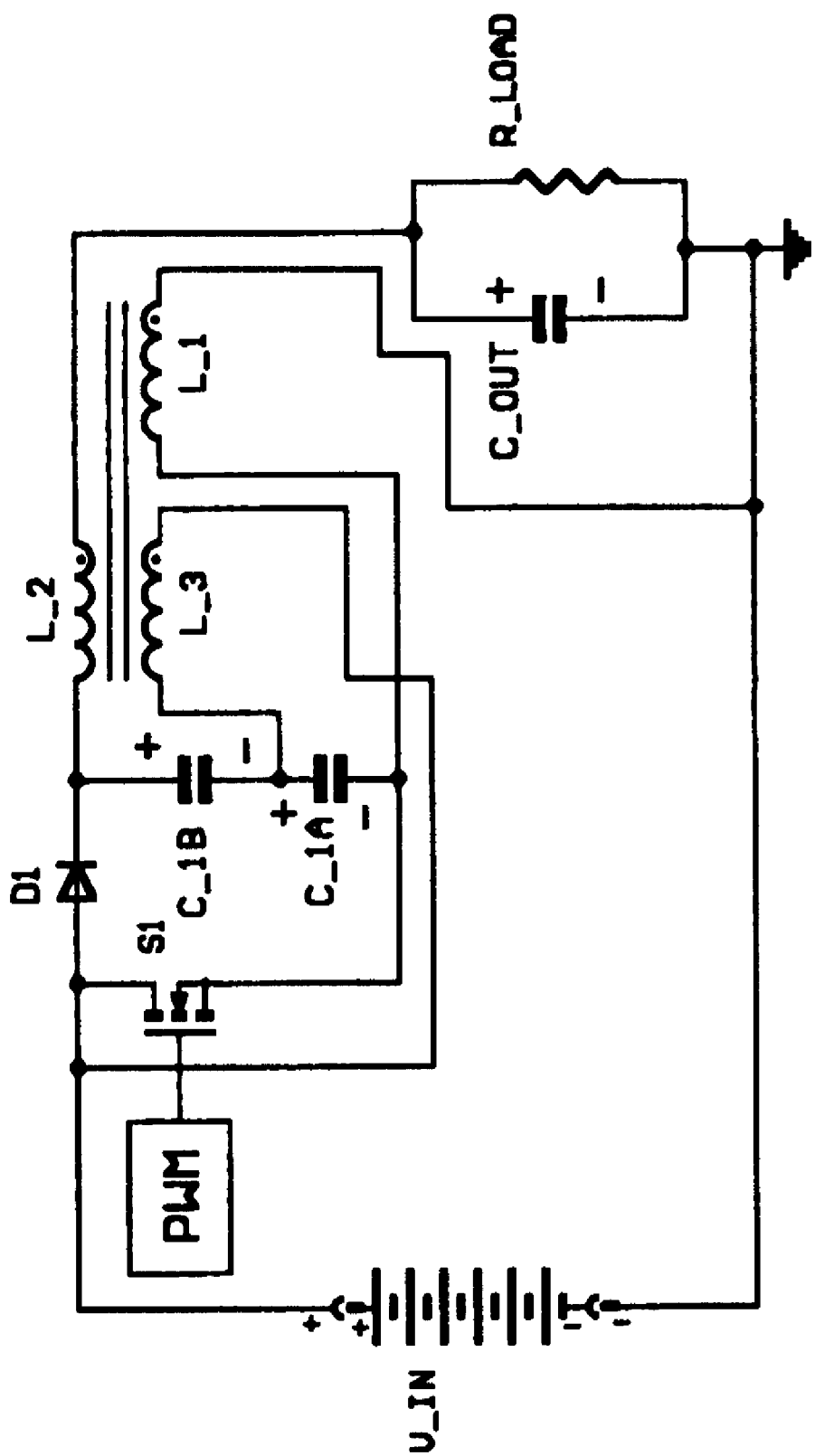
FIG. 25 illustrates an embodiment of the FIG. 16 circuit in which both input and output currents can be made to be zero ripple by suitable choice of coupling coefficient and open circuit inductances.

FIG. 25 illustrates an embodiment in which zero input ripple and zero output ripple can simultaneously be obtained using a single core structure as illustrated in FIG. 14. In the FIG. 14 structure the L1 and L2 windings, which are wound on the outer legs, are uncoupled. Both the L1 and L2 windings are coupled to the center post of the core and the L3 winding. The criteria for zero ripple is the same as for the FIG. 24 circuit, but in this case the L3 windings are integrated into a single winding and the two cores are integrated onto a common core with effectively two independent coupled inductors on the same core. Flux generated in the L1 winding will not pass through the L2 winding because of the gap in the right outer leg and the fact that the center post has no gap and thus presents a magnetic short circuit to flux generated in the left outer leg. Similarly flux generated in the L2 winding will pass through the center post but will not pass through the left outer leg because of the gap in the left outer leg. L1D refers to the dotted terminal of the L1 winding, L1UD refers to the undotted terminal of the L1 winding, similarly for the L2 and L3 windings.

Figure 26:
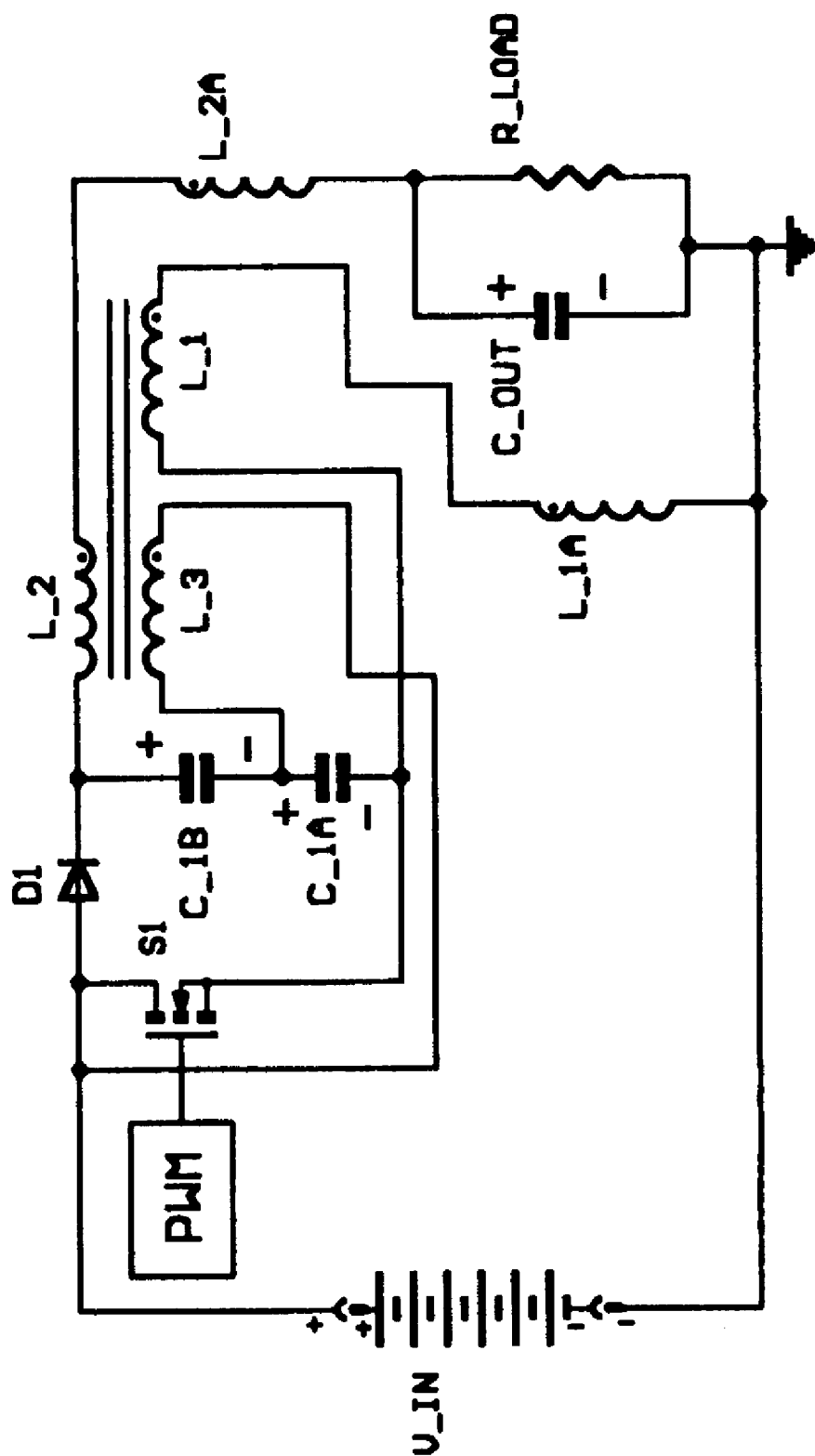
FIG. 26 illustrates an embodiment of the FIG. 16 circuit in which chokes are added that can reduce the input and output ripple currents to near zero.

FIG. 26 illustrates another embodiment similar to the FIG. 24 embodiment but in this case all three windings, L1, L2 and L3, are tightly coupled to each other and have the same number of turns. In this case all three windings can be colocated on the same core leg. Two small inductors are added, L_1A and L_2A, which reduce both the input ripple and output ripple to near zero levels.

Conclusions, Ramifications, and Scope of Invention

Thus the reader will see that the DC to DC converter circuits of the subject invention provides a relatively simple mechanism for converting a DC voltage at one level to a different DC voltage at a different level with both continuous input and output currents. In addition, these results can be achieved using a single coupled inductor.

While my above description contains many specificities, these should not be construed as limitations on the scope of the invention, but rather as exemplifications of preferred embodiments thereof. Many other variations are possible. For example, interleaved, parallel DC to DC converters with two or more parallel DC to DC converter sections using common input and output filter capacitors; DC to DC converters similar to those shown but which have instead high AC ripple voltages on input filter capacitors; DC to DC converters, similar to those shown in the drawings, but where the DC input source is instead a varying rectified AC signal. Accordingly, the scope of the invention should be determined not by the embodiments illustrated, but by the appended claims and their legal equivalents.

I claim:

1. A buck type DC to DC converter circuit comprising, an input, coupleable to a source of substantially DC voltage, having a first terminal and a second terminal, an output, coupleable to a load, having a first terminal and a second terminal with said second terminal of said output connected to said second terminal of said input, first switch means having a first terminal and a second terminal with said first terminal of said first switch means connected to said first terminal of said output, second switch means having a first terminal and a second terminal with said first terminal of said second switch means connected to said first terminal of said output and to said first terminal of said first switch means, operable substantially in anti-synchronization to said first switch means, a first capacitor having a first terminal and a second terminal with said first terminal of said first capacitor connected to said second terminal of said first switch means and with said second terminal of said first capacitor connected to said second terminal of said second switch means, a first inductor having a first terminal and a second terminal with said first terminal of said first inductor connected to said first terminal of said first capacitor and to said second terminal of said first switch means and with said second terminal of said first inductor connected to said first terminal of said input, a second inductor having a first terminal and a second terminal with said first terminal of said second inductor connected to said second terminal of said first capacitor and to said second terminal of said second switch means and with said second terminal of said second inductor connected to said second terminal of said output and to said second terminal of said input, whereby said buck type converter circuit simultaneously provides both non-pulsating input current and non-pulsating output current.

2. The converter circuit of claim 1 wherein said switch means comprise semiconductor switch means.

3. The converter circuit of claim 2 wherein said first inductor and said second inductor are integrated on a single common core.

4. The converter circuit of claim 3 wherein the coupling coefficient and the open circuit inductances are set in such a manner as to provide substantially zero input current ripple.

5. The converter circuit of claim 1 with a generalized active reset switching cell further comprising, a third inductor connected in series with said first switch means having a first terminal and a second terminal with said first terminal of said third inductor connected to said second terminal of said first switch means and with said second terminal of said third inductor connected to said first terminal of said first capacitor and to said first terminal of said first inductor, third switch means having a first terminal and a second terminal with said first terminal of said third switch means connected to said second terminal of said first switch means and to said first terminal of said third inductor, operable substantially in anti-synchronization to said first switch means, a second capacitor having a first terminal and a second terminal with said first terminal of said second capacitor connected to said second terminal of said third switch means, whereby said generalized active reset switching cell provides a mechanism to achieve zero voltage switching for all switches for all transitions relying on the energy stored in said third inductor.

6. The converter circuit of claim 1 wherein said first and second inductors are replaced by coupled inductors by adding one secondary winding to each inductor and said first capacitor is replaced by two capacitors coupled in a series arrangement, whereby said secondary windings of said coupled inductors are electrically coupled to each other, to said output, and to said capacitors, and the open circuit winding inductances and magnetic coupling of said coupled inductors are set to provide substantially zero input and output ripple currents.

7. The converter circuit of claim 6 wherein the two coupled inductors are combined into a single coupled inductor integrated onto a common core, whereby said first and said second inductors are substantially uncoupled magnetically and said secondary windings are combined into a single secondary winding and the open circuit winding inductances and magnetic coupling of said coupled inductor are set to provide substantially zero input and output ripple currents.

8. The converter circuit of claim 7 further comprising, a third inductor inserted between said input and said first inductor, a fourth inductor inserted in series with said second inductor and between said second inductor and said second terminals of said input and said output, wherein said coupled inductor comprises three windings all mutually coupled magnetically, whereby said third and said fourth inductors reduce said input and output ripple currents to substantially zero.

9. A boost type DC to DC converter circuit comprising, an input, coupleable to a source of substantially DC voltage, having a first terminal and a second terminal, an output, coupleable to a load, having a first terminal and a second terminal with said second terminal of said output connected to said second terminal of said input, first switch means having a first terminal and a second terminal with said first terminal of said first switch means connected to said first terminal of said input, second switch means having a first terminal and a second terminal with said first terminal of said second switch means connected to said first terminal of said input and to said first terminal of said first switch means, operable substantially in anti-synchronization to said first switch means, a first capacitor having a first terminal and a second terminal with said first terminal of said first capacitor connected to said second terminal of said second switch means and with said second terminal of said first capacitor connected to said second terminal of said first switch means, a first inductor having a first terminal and a second terminal with said first terminal of said first inductor connected to said second terminal of said first switch means and to said second terminal of said first capacitor and with said second terminal of said first inductor connected to said second terminal of said input and to said second terminal of said output, a second inductor having a first terminal and a second terminal with said first terminal of said second inductor connected to said second terminal of said second switch means and to said first terminal of said first capacitor and with said second terminal of said second inductor connected to said first terminal of said output, whereby said boost type converter circuit simultaneously provides both non-pulsating input current and non-pulsating output current.

10. The converter circuit of claim 9 wherein said switch means comprise semiconductor switch means.

11. The converter circuit of claim 10 wherein said first inductor and said second inductor are integrated on a single common core.

12. The converter circuit of claim 11 wherein the coupling coefficient and the open circuit inductances are set in such a manner as to provide substantially zero output current ripple.

13. The converter circuit of claim 9 with a generalized active reset switching cell further comprising, a third inductor having a first terminal and a second terminal placed in series with said first switch means with said first terminal of said third inductor connected to said second terminal of said first switch means and with said second terminal of said third inductor connected to said second terminal of said first capacitor and to said first terminal of said first inductor, third switch means having a first terminal and a second terminal with said first terminal of said third switch means connected to said second terminal of said first switch means and to said first terminal of said third inductor, operable substantially in anti-synchronization with said first switch means, a second capacitor having a first terminal and a second terminal with said first terminal of said second capacitor connected to said second terminal of said third switch means, whereby said generalized active reset switching cell provides a mechanism to achieve zero voltage switching for all switches for all transitions relying on the energy stored in said third inductor.

14. The converter circuit of claim 9 wherein said first and second inductors are replaced by coupled inductors by adding one secondary winding to each inductor and said first capacitor is replaced by two capacitors coupled in a series arrangement, whereby said secondary windings of said coupled inductors are electrically coupled to each other, to said input, and to said capacitors, and the open circuit winding inductances and magnetic coupling of said coupled inductors are set to provide substantially zero input and output ripple currents.

15. The converter circuit of claim 14 wherein the two coupled inductors are combined into a single coupled inductor integrated onto a common core, whereby said first and said second inductors are substantially uncoupled magnetically and said secondary windings are combined into a single secondary winding and the open circuit winding inductances and magnetic coupling of said coupled inductors are set to provide substantially zero input and output ripple currents.

16. The converter circuit of claim 15 further comprising, a third inductor inserted between said output and said second inductor, p1 a fourth inductor inserted in series with said first inductor and between said first inductor and said second terminals of said input and said output, wherein said coupled inductor comprises three windings all mutually coupled magnetically, whereby said third and said fourth inndustors reduce said input and output ripple currents to substantially zero.

* * * * *